(12) United States Patent
Kito

(10) Patent No.: US 6,628,899 B1
(45) Date of Patent: Sep. 30, 2003

(54) IMAGE PHOTOGRAPHING SYSTEM, IMAGE PROCESSING SYSTEM, AND IMAGE PROVIDING SYSTEM CONNECTING THEM, AS WELL AS PHOTOGRAPHING CAMERA, IMAGE EDITING APPARATUS, IMAGE ORDER SHEET FOR EACH OBJECT AND METHOD OF ORDERING IMAGES FOR EACH OBJECT

(75) Inventor: Eiichi Kito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 147 days.

(21) Appl. No.: 09/685,073

(22) Filed: Oct. 10, 2000

(30) Foreign Application Priority Data

Oct. 8, 1999 (JP) .......................................... 11-287613

(51) Int. Cl.⁷ .......................... G03B 17/00; H04N 5/76; H04N 5/232
(52) U.S. Cl. .......................... 396/56; 396/311; 396/429; 348/207.1; 348/207.2; 348/211.99; 348/231.3; 348/333.02; 355/40
(58) Field of Search ............................ 396/56–59, 310, 396/311, 429; 348/61, 552, 207.1, 207.2, 211.2, 211.3, 211.14, 211.1, 211.99, 231.6, 231.3, 333.02; 355/40

(56) References Cited

U.S. PATENT DOCUMENTS 5,387,955 A * 2/1995 Cocca ......................... 396/59
6,169,596 B1 * 1/2001 Shiota ......................... 355/40
6,337,951 B1 * 1/2002 Nakamura .................... 396/57
6,396,537 B1 * 5/2002 Squilla et al. ............. 396/56 X

FOREIGN PATENT DOCUMENTS

JP          7-13225       1/1995    .......... G03B/15/00

* cited by examiner

Primary Examiner—W. B. Perkey
(74) Attorney, Agent, or Firm—Sughrue Mion, PLLC

(57) ABSTRACT

The image photographing, processing and providing systems as well as the photographing camera utilize a system which has a second communication device for transmitting photographing information of an object when at lease the object is photographed, a photographing device, a first communication device operated in association with the photographing device for receiving the photographing information transmitted from the second communication device and a storing unit for storing the photographing information received by the first communication device and the image data of the images of the photographed object which are related to each other. The image editing apparatus, the image order sheet and image ordering method for each object utilize the photographed result by the image photographing system and the photographing camera. These systems and the camera can effectively function even if many are installed in a wide site such as a theme park by the application of the transmitting/receiving function. The camera, the apparatus, the order sheet and the ordering method can simply and surely create albums and select photographs for ordering.

34 Claims, 14 Drawing Sheets

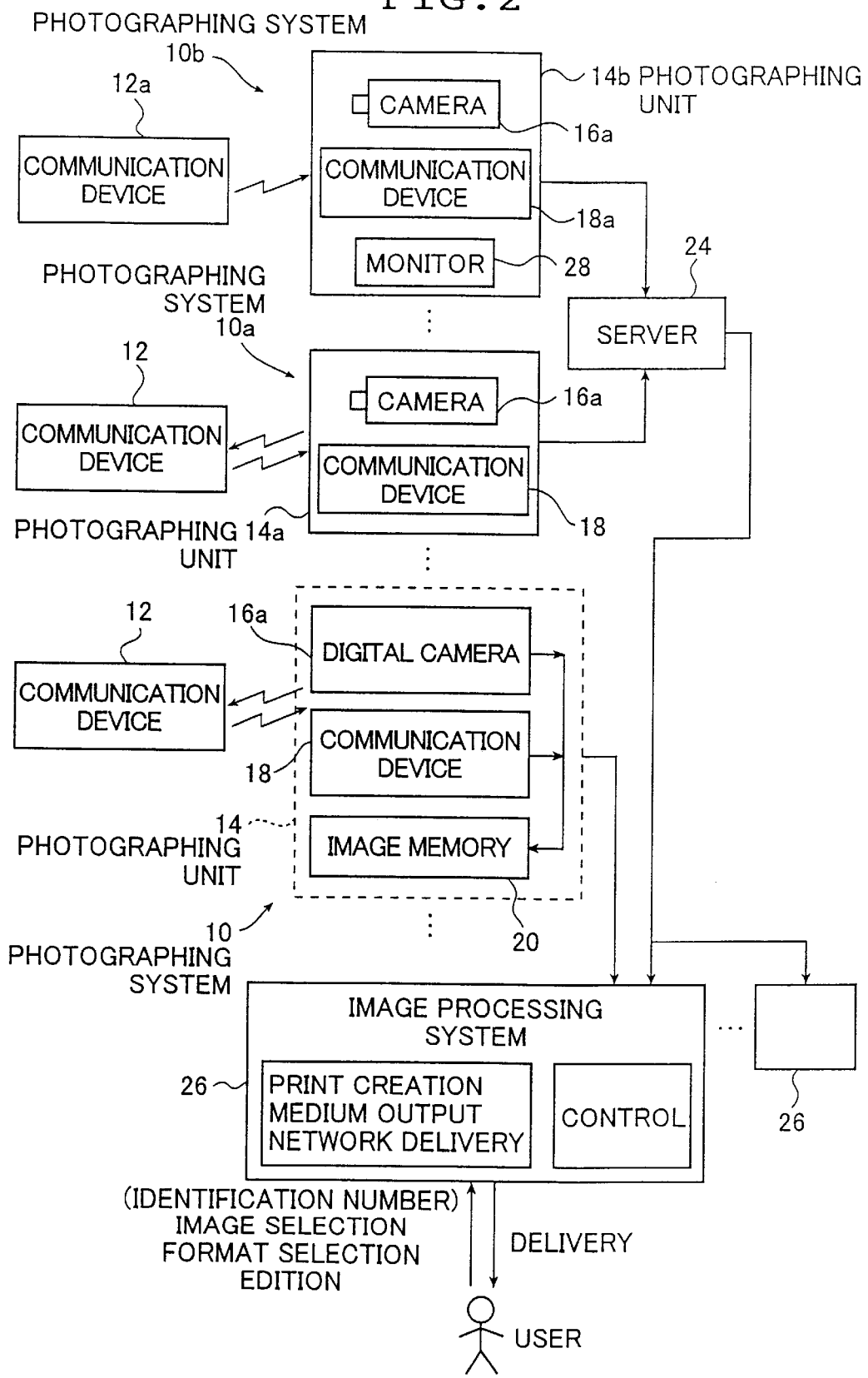

FIG.12
| DATE/TIME | PHOTO-GRAPHING NUMBER | PHOTO-GRAPHING POINT | USER INFOR-MATION | PHOTO-GRAPHING CONDITIONS |
|---|---|---|---|---|
| . | . | . | . | . |
| . | . | . | . | . |
| . | . | . | . | . |
| ①→ 08.20,10:30 | A0221 | A | 01234 | |
| ②→ 08.20,10:55 | B0353 | B | 21296 | |
| 08.20,10:55 | B0353 | B | 29230 | |
| . | . | . | . | . |
| . | . | . | . | . |
| . | . | . | . | . |
FIG.13A
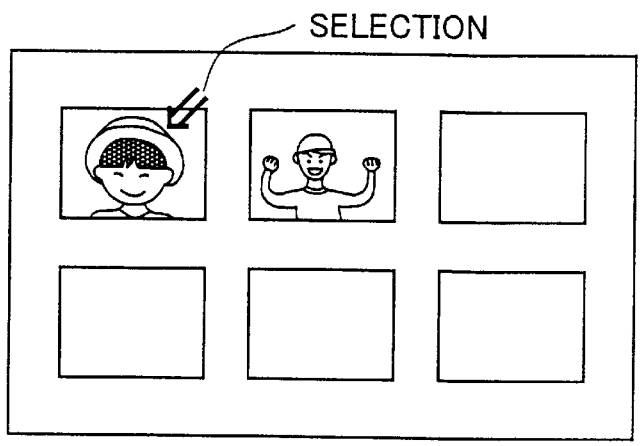
FIG.13B
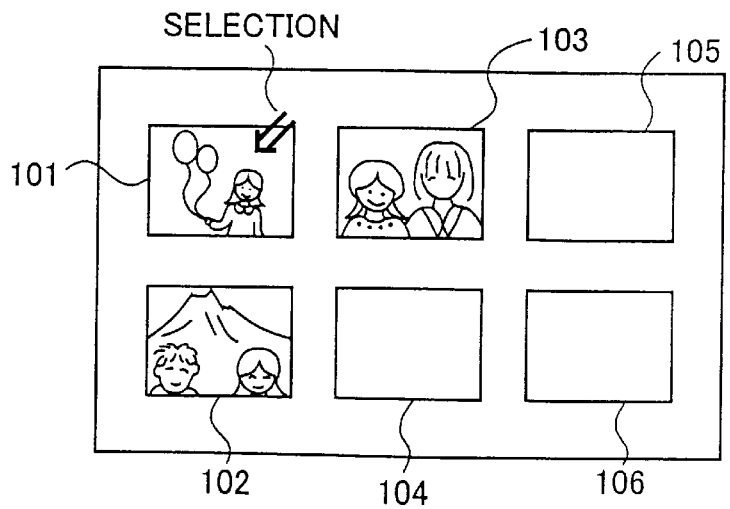

IMAGE PHOTOGRAPHING SYSTEM, IMAGE PROCESSING SYSTEM, AND IMAGE PROVIDING SYSTEM CONNECTING THEM, AS WELL AS PHOTOGRAPHING CAMERA, IMAGE EDITING APPARATUS, IMAGE ORDER SHEET FOR EACH OBJECT AND METHOD OF ORDERING IMAGES FOR EACH OBJECT

BACKGROUND OF THE INVENTION

The present invention relates to an image photographing system, an image processing system, and an image providing system composed of them connected to each other, as well as a photographing camera, an image editing apparatus, an image order sheet for each object and a method of ordering images for each object. These are preferably used in amusement parks, theme parks, prominent sightseeing spots and the like, and are suitable for photographing in a group tour, sightseeing in a group, or a ceremony or an event in a group, and for subsequent album creation including image editing and individual orders.

Hitherto, in prominent sightseeing spots and the like, so-called sightseeing pro-photographers provide a service including photographing preparing a background, a property and the like used for photographing. Further, in recent years, digital photographing and print systems having an automatic photographing function are installed in many sightseeing spots.

As conventional digital photographing and print systems, there is known, for example, a system installed in a place where an attraction is performed in so-called theme parks and the like to automatically photograph a vehicle at a time it reaches the place. Many of this type of digital photographing and print systems are installed in places where a photographing angle, at which ordinary users cannot take a photograph, can be obtained. The users confirm the photographed contents on a monitor at the exit of the attraction and order and purchase prints when they are satisfied with the photographed contents.

In contrast, when a case, in which individual persons take a photograph, is taken into consideration, it is necessary for them to release the shutter of a camera at high speed so that the camera does not move unintentionally to take a photograph of, for example, a person riding a vehicle such as a roller coaster traveling at high speed in an amusement park. However, there is a case in beginners that they do not know even the provision of a shutter-speed-priority mode and an aperture-priority mode with an AE (automatic exposure) camera.

As to this matter, the technology of "Photographing mode selection camera and transmitter thereof" disclosed in Japanese Unexamined Patent Application Publication No. 7-13225 can be used as a reference. A camera according to the technology includes a receiver for receiving the photographing modes transmitted from transmitters, which are disposed in respective predetermined areas for transmitting photographing modes inherent in the respective areas, and a selector for automatically selecting the photographing modes so as to realize a camera to which a particular mode can be automatically set in accordance with a place, where photographing is carried out, and with an object to be photographed in order to permit even a beginner to take a photograph in a proper photographing mode.

In group affairs including group tours such as sightseeing tours (e.g. school excursion, company trip, inspection tour by inspection party or package tour) and group tours for spectating Olympic games, soccer, tennis, ski and motor sport (e.g. F1), ceremonies such as wedding ceremony and Buddist memorial service, festivals and various other events, a large number of group photos and snapshots of members are taken. The thus taken group photos and snapshots are used in commemoration of the tours, sightseeing tours, ceremonies and events. Some of them are collected for creating a single type of albums, which are distributed to the respective members of a group so that they can select and give orders for photos on which they can be found, for creation of individual albums.

When editing photos taken in a group tour, sightseeing in a group, or a ceremony or event in a group to create a single type of group albums, photographers or album editors check a multiplicity of output photographic prints visually and select a necessary number of photographic prints for editing, while avoiding extreme unbalance of the photographed scenes and persons.

Photos taken in a group tour, sightseeing in a group, or a ceremony or event in a group are all posted or collected on an album so that the respective members can give orders.

However, they must check all the photos posted or collected on an album to select the photos on which they can be found. In the case of a large number of photos, selection is laborious and time-consuming.

In recent years, large amusement parks, that is, so-called theme parks have been constructed in many places where it is strongly desired to introduce an automatic photographing system making use of the above-mentioned digital photographing and print system. When a plurality of digital photographing and print systems are installed in the wide area of a theme park, there arise problems to be solved as described below. That is, the customers, who utilize these digital photographing and print systems, must wait for the completion of prints in the place of the photographing each time photographing is carried out; when a plurality of scenes are photographed, the prints of these scenes are collected at random and prints in which scenes relating to each other are collected together (in other words, prints edited in accordance with the preference of a user) cannot be provided; and it is necessary to improve the efficiency of the maintenance of the digital photographing and print system.

That is, when apparatuses have an independent photographing and print function, respectively as in conventional apparatuses, there is a problem that a user must wait for the completion of prints in the respective places where the apparatuses are installed and this is troublesome to the user. Further, the user must purchase prints in the respective places where the apparatuses are installed, from which a problem is arisen in that a user cannot compare and select prints, with a result that the prints are made expensive, and further a problem is arisen in that while a plurality of scenes are photographed, more pleasant prints cannot be made by editing them.

Furthermore, there also is a problem that it is not advantageous to install many sets of the apparatuses because the structure of the apparatus is complicated and the maintenance thereof is troublesome.

Editing operation of the photos taken in a group tour, sightseeing in a group, or a ceremony or event in a group as mentioned above for creating group albums is laborious and troublesome. Furthermore, the frequency of appearance of the members on the selected photos cannot be made uneven, which often incurs disrepute of the members.

In addition, when individuals want to give orders from the photos taken in a group tour, sightseeing in a group, or a ceremony or event in a group, they must check all the photos posted or collected on an album to select photos on which they can be found. In the case of a large number of photos, selection is laborious and time-consuming.

SUMMARY OF THE INVENTION

In order to attain the first object described above, the present invention provides an image photographing system comprising a second communication device for transmitting photographing information of an object to be photographed when at least the object is photographed, a photographing device for photographing the object, a first communication device operated in association with the photographing device for receiving the photographing information transmitted from the second communication device; and a storing unit for storing the photographing information received from the second communication device by the first communication device and image data of images of the object photographed by the photographing device in which the photographing information and the image data of each of the images of the object are related to each other.

Preferably, the first communication device is a transmitting/receiving unit for transmitting query information to the second communication device simultaneously when, before or after the object is photographed by the photographing device as well as for receiving the photographing information transmitted by the second communication device, and the second communication device is a transmitting/receiving unit for receiving the query information transmitted by the first communication device and for transmitting the photographing information in response to the query information.

Preferably, the first communication device is a receiving unit, the second communication device is a transmitting unit, and the photographing device photographs the object when the first communication device receives the photographing information transmitted from the second communication device.

Preferably, the second communication device is a transmitting unit for transmitting the photographing information at all times; and the first communication device is a receiving unit for receiving the photographing information transmitted by the second communication device simultaneously when, before or after the object photographed by the photographing device.

It is preferable that the image photographing system further comprises an electromagnetic wave irradiation unit operated in association with the photographing device and for irradiating electromagnetic energy simultaneously when, before or after the object is photographed by the photographing device, wherein the second communication device is a transmitting unit which is started in response to the electromagnetic energy irradiated from the electromagnetic wave irradiation unit simultaneously when, before or after the object is photographed by the photographing device and which transmits the photographing information; and the first communication device is a receiving unit for receiving the photographing information transmitted by the second communication device.

Preferably, the first communication device comprises the electromagnetic wave irradiation unit.

Preferably, the photographing device, the first communication device and the storing unit are constructed integrally as a photographing camera.

Preferably, a plurality of second communication devices are provided.

When the first communication device receives a plurality of the photographing information from the plurality of second communication devices, respectively, the storing unit preferably stores image data of an image taken by the photographing device and the plurality of photographing information received from the plurality of second communication devices by relating them to each other.

Preferably, the second communication device is carried by the object.

Preferably, the photographing information includes identification information for identifying the object registered in the second communication device.

The present invention provides an image processing system comprising an image search unit for searching image data of at least one image corresponding to at least one of photographing information from the photographic information and image data of images stored in the storing unit of the image photographing system described above by relating the image data and the photographing information, and an image processing unit for processing the image data of the at least one image searched by the image search unit.

It is preferable that the image processing system further comprises a first reading unit for reading the photographing information recorded in the second communication device of the image photographing system, wherein the image search unit searches the image data of the at least one image corresponding to at least one of the photographing information read by the first reading unit from the image data of the images stored in the storing unit and the photographing information which are related to each other.

Preferably, at least one of the photographing information is identification information for identifying the object.

It is also preferable that the image processing system further comprises an image display unit for displaying the at least one image searched by the image search unit, an image designation unit for designating a necessary image from the at least one image displayed on the image display unit, and an image output unit for outputting the designated image.

Preferably, the image output unit is at least one of a print output unit for outputting the designated image as a photo print, a medium output unit for outputting an image data recording medium in which the image data of the designated image is recorded, and an image delivery unit for delivering the image data of the designated image through a communication unit.

The present invention provides an image providing system comprising at least one image photographing system described above, and at least one image processing system described above, wherein at least one image photographing system and at least one image processing system are connected to each other.

In order to attain the second object, the present invention provides a photographing camera comprising a photographing device for photographing at least one object, a first communication device for receiving photographing information transmitted from at least one second communication device carried by the at least one object to be photographed, the photographing information including identification information for identifying the at least one object, and a storing unit for storing the photographing information of the at least one object received by the first communication device and the image data of the image of the at least one object photographed by the photographing device which are related to each other.

The present invention provides an image edit apparatus comprising a storing unit for storing image data of images of a plurality of scenes photographed in relation to a plurality of objects and photographing information including identification information of the plurality of objects photographed in the respective images by relating the photographing information to the image data of the respective images, a reading unit for reading, from the storing unit, the image data of some images, which are selected from the images of the plurality of scenes in order to edit the some images as an album, and the photographing information stored in relation to the image data of the some images, a display unit for displaying reproduced images of the image data read by the reading unit, and a counting unit for counting, as to each of the plurality of objects photographed in the some selected images, photographing frequency of each object based on the identification information of each object read by the reading unit, wherein the photographing frequency of the each object counted by the counting unit is displayed on the display unit as to the plurality of objects.

It is preferable that the image edit apparatus further comprises an image search unit for searching the image data of the images stored in relation to the photographing information in the storing unit using the photographing information, wherein the image search unit searches the images in which the each object is photographed using the photographing information, which is displayed on the display unit, of the each object whose photographing frequency is out of a preset frequency range, and searched images are read by the reading unit and displayed on the display unit.

It is also preferable that the image edit apparatus further comprises an image combining unit for combining the image data of the some selected images so as to edit the same selected images as the album when the photographing frequency of the each object displayed on the display unit is within the preset frequency, wherein the some images, which are edited as the album based on the image data combined by the image combining unit, are displayed on the display unit.

Preferably, the image combining unit combines information relating to the photographing information of the plurality of objects photographed in at least one image of the some images edited as the album as character data or line image data.

It is also preferable that the image edit apparatus further comprises an image output unit for outputting the images combined as the image data by the image combining unit and edited as the album.

Preferably, the storing unit is a storing unit for storing the images photographed by the photographing device in the image photographing system described above or the photographing camera described above.

The present invention provides an image edit apparatus comprising a storing unit for storing image data of images of a plurality of scenes photographed in relation to a plurality of objects including a particular object and photographing information including identification information of the plurality of objects photographed in the respective images by relating the photographing information to the image data of the respective images, an image search unit for searching and selecting a plurality of images relating to the particular object from the images of the plurality of scenes stored in the storing unit using the photographing information relating to the particular object, a reading unit for reading the image data of the plurality of images searched and selected by the search unit; an image processing unit for creating the image data of the respective reduced images of the plurality of images from the image data of the plurality of images read by the reading unit, a combining unit for combining a name of the particular object, the respective reduced images of the plurality of images, order numbers of the respective images corresponding to the respective reduced images, and order number fields provided in correspondence to respective order numbers as an image order sheet for the particular object; and an image output unit for outputting the image order sheet for the particular object combined by the combination unit.

Preferably, a title is further combined in the image order sheet for the particular object.

It is preferable that the image edit apparatus further comprises a display unit for displaying at least one of a result of search carried out by the image search unit, the images or the photographing information read by the reading unit, the respective reduced images of the plurality of images created by the image processing unit, and the image order sheet for the particular object combined by the combining unit.

Preferably, the storing unit is a storing unit for storing the images photographed by the photographing device in the image photographing system described above or the photographing camera described above.

Preferably, the plurality of images relating to the particular object are images, in which the particular object is photographed, or images, in which at least one of a plurality of objects belonging to a particular group to which the particular object belongs, is photographed.

The present invention provides an image order sheet for each object comprising a name of a particular object, reduced images of a plurality of images relating to the particular object selected from the images of a plurality of scenes photographed as to a plurality of objects including the particular object, order numbers of respective images corresponding to the reduced images of the plurality of images; and order number fields provided in correspondence to the respective order numbers.

Preferably, the image order sheet further comprises a title including a name of a particular event in which the particular object is participated and the images of the plurality of scenes are ones as to the plurality of objects photographed in the particular event.

The present invention provides a method of ordering at least one image for each object comprising the steps of delivering, through a communication unit, an image order sheet for each object as data capable of being displayed on an image display unit, the order sheet including a name of a particular object, reduced images of a plurality of images relating to the particular object selected from images of a plurality of scenes photographed as to a plurality of objects including the particular object, order numbers of respective images corresponding to the reduced images of the plurality of images, and order number fields provided in correspondence to the respective order numbers, displaying the order sheet for each object on an image display unit carried by the particular object; and receiving number of orders for the respective images input to the order number field by the particular object.

Preferably, the image order sheet further comprises a title including a name of a particular event in which the particular object is participated and the images of the plurality of scenes are ones as to the plurality of objects photographed in the particular event.

BRIEF DESCRIPTION OF THE DRAWINGS

FIG. 2 is a block diagram showing the specific arrangement of an embodiment of the image providing system shown in FIG. 1B;

FIG. 12 is a table showing an example of the specific arrangement of photographing information stored in the image memory of the server shown in FIG. 2;

FIGS. 13A and 13B are views showing examples of images displayed in the image processing system, respectively;

DETAILED DESCRIPTION OF THE INVENTION

The image photographing system, image processing system, and image providing system connecting them, as well as photographing camera, image editing apparatus, image order sheet for each object and method of ordering images for each object are now described below in detail with reference to the preferred embodiments shown in the accompanying drawings.

Figure 1A:
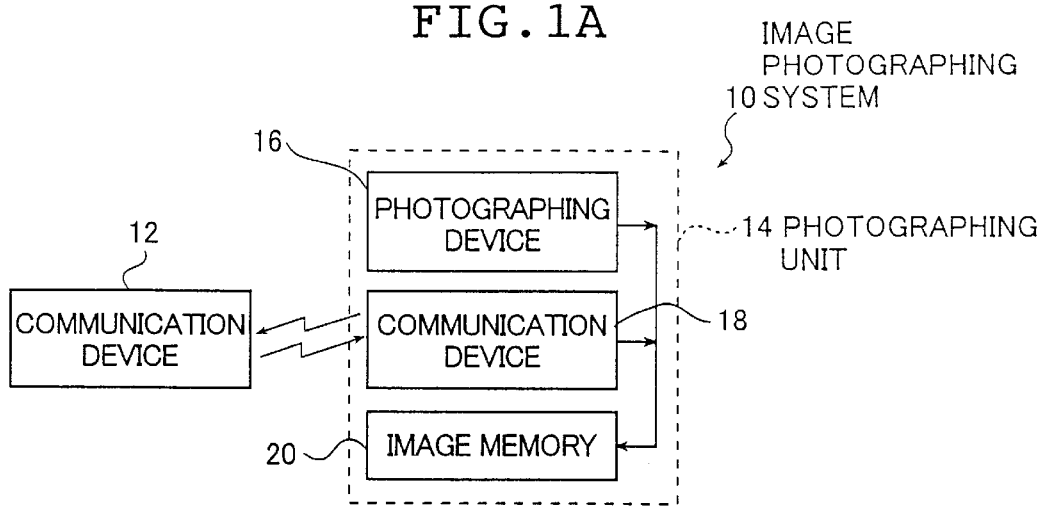
FIG. 1A is a conceptual block diagram showing the basic system arrangement of an embodiment of the image photographing system according to the present invention.
Figure 1B:
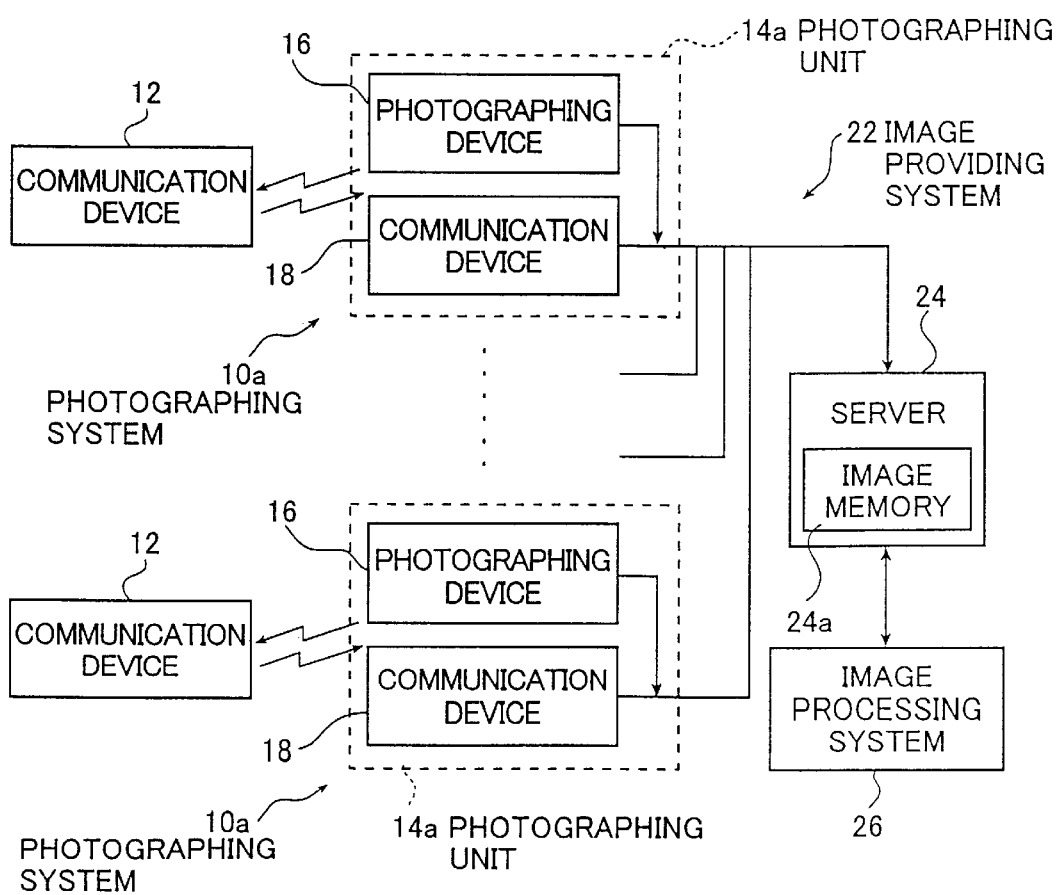
FIG. 1B is a conceptual block diagram showing the basic system arrangement of an embodiment of the image providing system according to the present invention.

FIGS. 1A and 1B are schematic block diagrams showing the outline of an exemplary image photographing system and an exemplary image providing system according to the present invention, respectively. The image photographing system 10 shown in FIG. 1A is basically composed of a pair of a user-side two-way communication device 12 and a photographing unit 14 including a photographing device 16 typically represented by a digital camera. The photographing unit 14 comprises the photographing device 16 for photographing a user, a unit-side two-way communication device 18 for transmitting signals to and receiving signals from the user-side communication device 12, and an image memory 20 for storing image data of an image taken with the photographing device 16 in association with information such as user's identification code and number (hereinafter also referred to as ID information) received from the user-side communication device 12.

The image (image data) stored in the image memory 20 in association with the user ID information is then input to an image processing system to be mentioned below (not shown in FIG. 1A; see FIG. 2, reference numeral 26) for image processing. Thereafter, the processed image data is preferably output as a print or as an image data recording medium storing the processed image data, displayed for monitoring, or delivered through Internet or the like. For inputting the ID information and the image data in the image memory 20 to the image processing system 26, a communication line or the image memory 20 of a portable type may be used. In the latter case, the image memory 20 detached from the photographing unit 14 is transported to the image processing system 26 to be set therein for data reading.

The image providing system 22 shown in FIG. 1B comprises a photographing system 10a including a plurality of communication devices 12 and a plurality of photographing units 14a; a server 24 that is connected to the plurality of photographing units 14a and that stores image data and ID information acquired from the photographing units 14a; and the image processing system 26 that processes the image data stored in the server 24 and that preferably outputs an image as a print or a medium, displays for monitoring or delivers through network.

In the photographing system 10a of the illustrated image providing system 22, the image memory 20 is removed from the photographing unit 14 of the photographing system 10 shown in FIG. 1A to form the photographing unit 14a including a photographing device 16 and a communication device 18, and the removed image memory 20 is incorporated in the server 24 as an image memory 24a. Such systematization for easier manipulation is a characteristic feature of the image providing system 22. In the photographing system 10a used in the image providing system 22, part or all of the photographing units 14a each may be replaced by the photographing unit 14 used in the photographing system 10, or be provided with a temporary memory for temporarily storing image data of one to several images.

FIG. 2 is a block diagram showing the specific arrangement of an embodiment of the image providing system 22 shown in FIGS. 1A and 1B. The image providing system 22 shown in FIG. 2 comprises a plurality of photographing systems 10, 10a and 10b of which the arrangement and the type are different from each other, a server 24 and a plurality of image processing systems 26.

As mentioned above, the photographing system 10 comprises a two-way communication device 12 and a photographing unit 14 which includes a digital camera 16a as a photographing device, a two-way communication device 18 and an image memory 20 for storing an image taken with the digital camera 16a as image data. The photographing system 10*a* comprises a communication device 12 and a photographing unit 14*a* which includes a digital camera 16*a* and a communication device 18, as mentioned above. These photographing systems 10 and 10*a* are both of self-active type. Therefore, both of the photographing units 14 and 14*a* photograph a user (customer) having the two-way communication device 12 as an object.

The photographing system 10*b* comprises a transmitter 12*a* and a photographing unit 14*b* which includes a digital camera 16*a* as a photographing device, a receiver 18*a* and a monitor 28, and photographing is performed according to the user's intention. Therefore, the photographing unit 14*b* is of user's request type in which a user or persons having a relation with him or her are photographed when the user having the transmitter 12*a* requests photographing with his or her own will.

In the image providing system 22 according to the embodiment under consideration, the photographing unit 14 and other two types of the photographing units 14*a* and 14*b* are appropriately set in accordance with the photographing point and combined with the communication devices 12 and 12*a* possessed or carried by the user to form the photographing systems 10, 10*a* and 10*b*.

The illustrated image providing system 22 comprises a plurality of the photographing units 14, 14*a* and 14*b*, respectively, but is not particularly limited to this embodiment. Thus, the image providing system 22 may comprise at least one unit selected from these photographing units 14, 14*a* and 14*b*, or at least one photographing unit (not shown) composed of the photographing unit 14*b* and an image memory.

Figure 3:
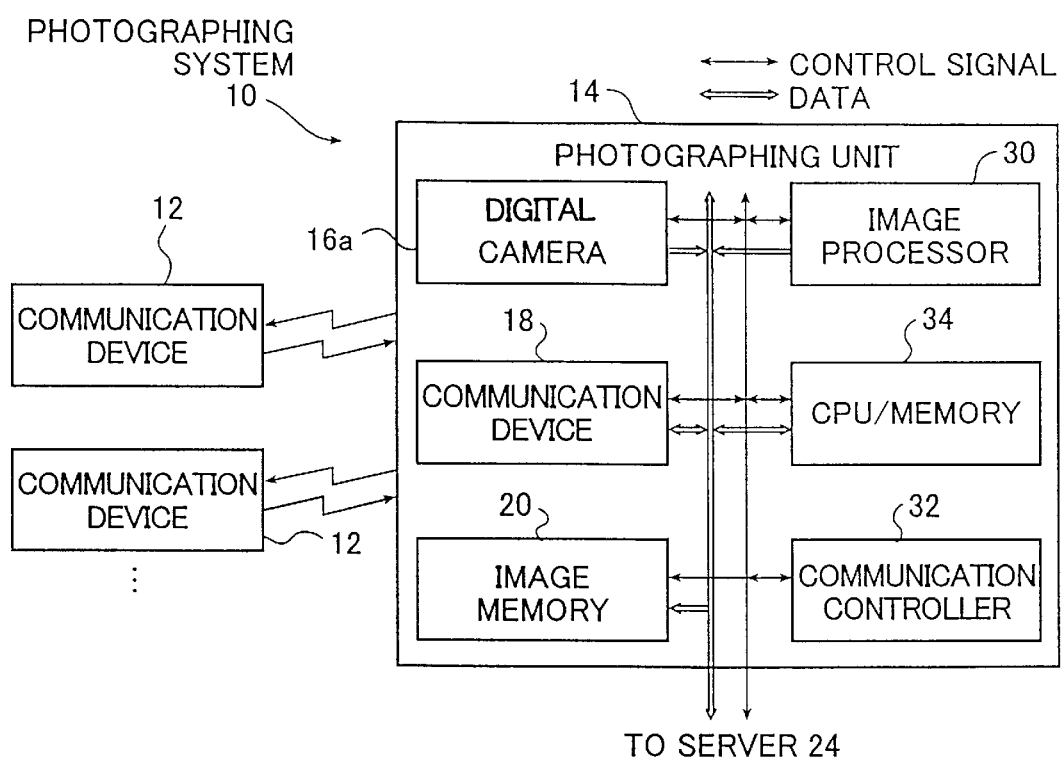
FIG. 3 is a block diagram showing the detailed arrangement of an example of the photographing unit shown in FIG. 2.

FIG. 3 shows the detailed arrangement of an example of the photographing unit 14 in the photographing system 10 of self-active type. In the photographing unit 14 shown in FIG. 3, reference numeral 16*a* denotes the digital camera for use in photographing as mentioned above; reference numeral 18 denotes the unit-side two-way communication device for issuing a query signal to the two-way communication device 12 possessed or carried by the user upon photographing and for receiving the photographing information including the user's ID information that is registered in the communication device 12 and issued in response to the query signal, as mentioned above; reference numeral 20 denotes the image memory for storing an image (image data) taken with the digital camera 16*a* in association with the ID information, as mentioned above; reference numeral 30 denotes an image processor for subjecting the image (image data) taken with the digital camera 16*a* and stored in the image memory 20 to specified image processing schemes; reference numeral 32 denotes a communication controller for controlling a communication line with at least one of the server 24 and the image processing system 26; reference numeral 34 denotes a control section (CPU/memory) for controlling the photographing system 10 and the photographing unit 14 as a whole. It should be noted that the digital camera 16*a* may be replaced by an appropriate combination of another photographing device with an image information storage device. Further, when using the image memory 20 of portable type, the photographing unit 14 may not be provided with the communication controller 32. Alternatively, the communication controller 32 may be used to control two-way transmission between the communication devices 12 and 18.

Figure 4:
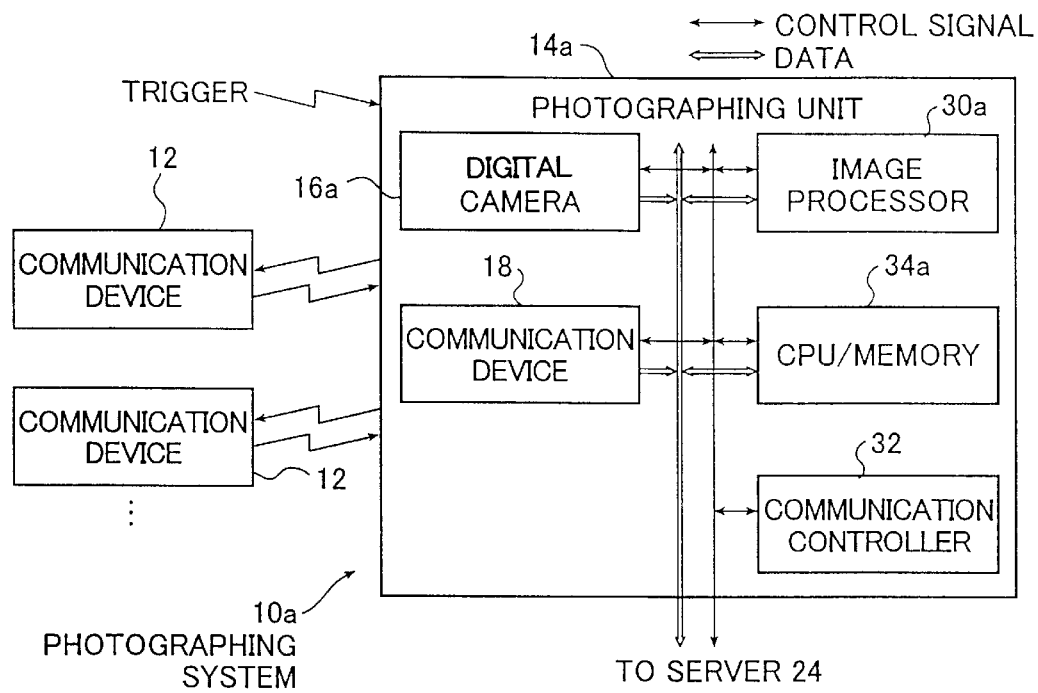
FIG. 4 is a block diagram showing the detailed arrangement of another example of the photographing unit shown in FIG. 2.

FIG. 4 shows the detailed arrangement of an example of the photographing unit 14*a* in the photographing system 10*a* of self-active type. In the photographing unit 14*a* shown in FIG. 4, reference numeral 16*a* denotes the digital camera as mentioned above; reference numeral 18 denotes the unit-side two-way communication device that issues the inquiry signal to and receives the photographing information from the user-side communication device 12, as mentioned above; reference numeral 30*a* denotes an image processor for subjecting an image (image data) taken with the digital camera 16*a* to specified image processing schemes; reference numeral 32 denotes the communication controller as mentioned above; reference numeral 34*a* denotes a control section (CPU/memory) for controlling the photographing system 10*a* and the photographing unit 14*a* as a whole.

Figure 5:
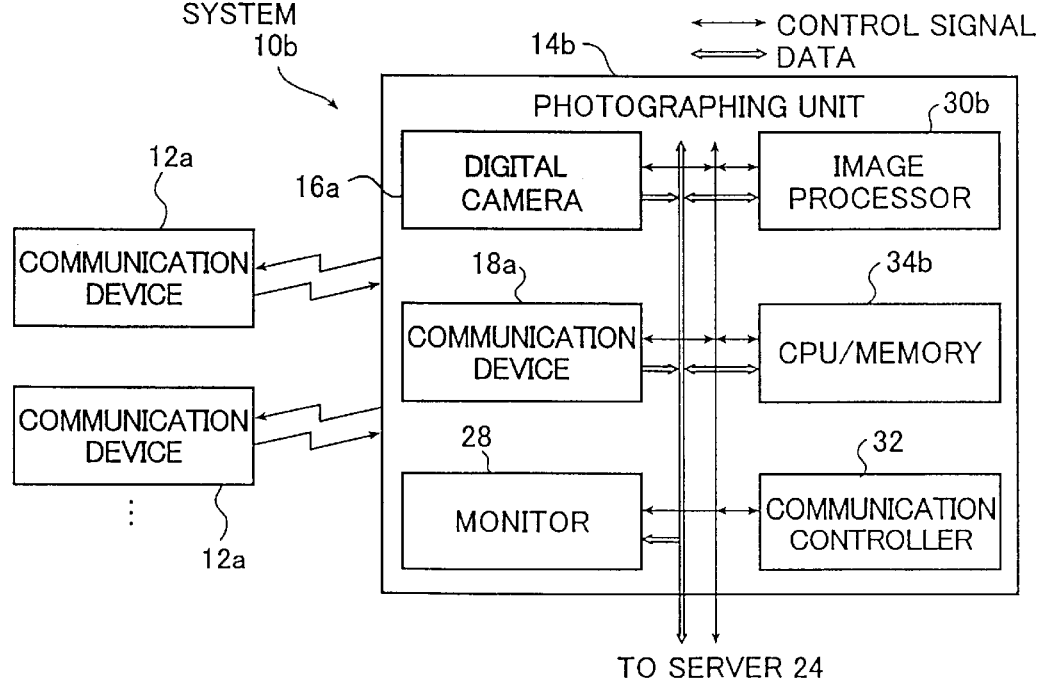
FIG. 5 is a block diagram showing the detailed arrangement of still another example of the photographing unit shown in FIG. 2.

Further, FIG. 5 shows the detailed arrangement of an example of the photographing unit 14*b* in the photographing system 10*b* of user's request type. In the photographing unit 14*b* shown in FIG. 5, reference numeral 18*a* denotes a unit-side receiver that receives a signal issued from a transmitter 12*a* possessed or carried by the user for user's request for photographing; reference numeral 16*a* denotes the digital camera as mentioned above; reference numeral 30*b* denotes an image processor for subjecting an image taken with the digital camera 16*a* to specified image processing schemes; reference numeral 28 denotes a monitor for displaying the image taken with the digital camera 16*a* after image processing has been performed in the image processor 30*b*; reference numeral 32 denotes the communication controller as mentioned above; reference numeral 34*b* denotes a controller (CPU/memory) for controlling the photographing system 10*b* and the photographing unit 14*b* as a whole.

In the photographing unit 14*b* shown in FIG. 5, the user-side transmitter 12*a* and the unit-side receiver 18*a* are used as the user-side and unit-side communication devices, respectively. This is not however the sole case of the invention. The user-side transmitter 12*a* may be replaced by the user-side two-way communication device 12, or the unit-side receiver 18*a* may be replaced by the unit-side two-way communication device 18.

The communication devices 12 and 12*a* used in the photographing systems 10, 10*a* and 10*b* as the transmitter/receiver or the transmitter possessed or carried by the user are not limited in any particular way, as far as the communication devices 12 and 12*a* can communicate with at least the communication devices 18 and 18*a* of the photographing units 14, 14*a* and 14*b* for necessary information. For example, so-called small-sized portable communication devices can be used, but IC cards capable of reception/transmission or transmission such as a non-contact (wireless) type IC card used as an IC pass, or non-contact IC cards of built-in battery type or electromagnetic induction type (without supply source) capable of transmission/reception or transmission as used in product monitoring tags in an electric wave type product monitoring system may be preferably used. The specific arrangement of the communication devices 12, 12*a*, 18 and 18*a* will be described below.

The respective image processors 30, 30*a* and 30*b* in the photographing units 14, 14*a* and 14*b* mentioned above may not be necessarily provided, but image processing including setup is preferably performed, and other image data processing such as storing to the image memory 20, storing to the server 24, and storing to the server 24 and conversion to image data suitable for displaying on the monitor 28 can be also performed, respectively.

The type of the server 24 is not particularly limited, as far as it includes the image memory 24*a* having a sufficient capacity to store image data of necessary or sufficient number of images to provide as prints in the image providing system 22 together with the photographing information including the ID information associated therewith.

The image processing system 26 receives the image data together with the photographing information from the photographing unit 14 or the server 24, selects necessary images to be output by searching, performs specified image processing schemes and optionally editing, and converts to a format adapted for image output such as print output, medium output, display for monitoring or delivery through network. The photographic print on which the processed image is reproduced is created in a print creating section and then output. In addition to or in place of print output, an image data storage medium in which image data of the processed image is stored may be output, or the processed image may be displayed on the monitor or delivered through Internet. The details of the image processing system 26 will be described below in greater detail.

In FIGS. 3 to 5 mentioned above and FIG. 6 to be mentioned below, single-lined arrows and double-lined thick arrows represent the flow of control signals and that of image data and ID information (ID data), respectively.

Figure 6:
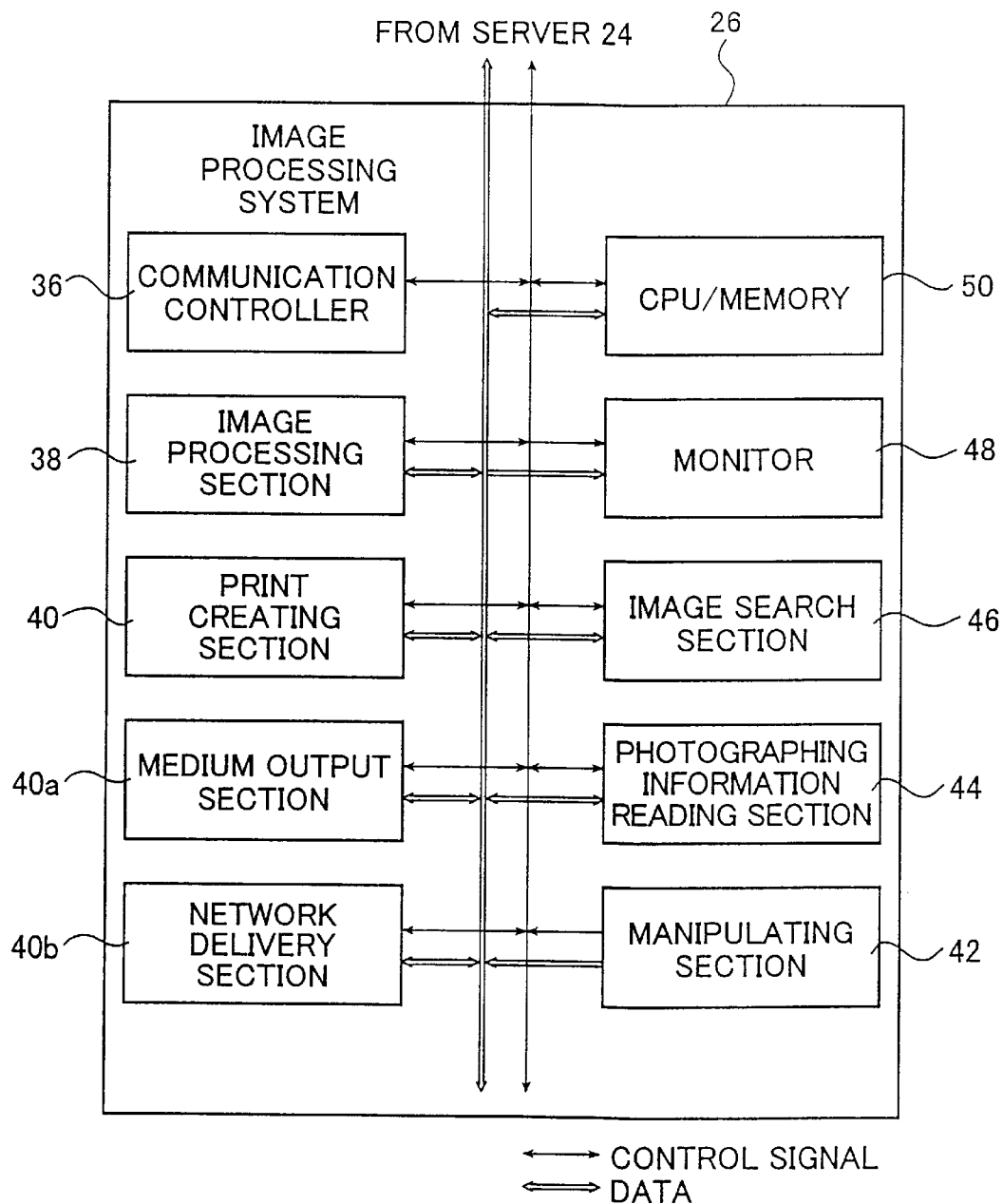
FIG. 6 is a block diagram showing the detailed arrangement of an embodiment of the image processing system shown in FIG. 2.

Further, the image processing system 26 shown in FIGS. 1B and 2 is installed in, for example, a center which has a user reception window. The detailed arrangement of an embodiment of the system 26 is shown in FIG. 6. In the image processing system 26 shown in FIG. 6, reference numeral 36 denotes a communication controller that is connected to the photographing units 14, 14a and 14b and that controls a communication line connecting with the server 24 having image data and photographing information including identification number (ID information) and the like stored therein, and reference numeral 38 denotes an image processing section for subjecting the image data transmitted from the photographing units 14, 14a and 14b to various image processing schemes such as editing, combining and the like.

Further, reference numeral 40 denotes a print creating section for creating a photographic print by printing an image on which the image data processed in the image processing section 38 is reproduced, onto a photographic paper and developing the printed image, and for delivering the photographic print to a user. Various known types of printers such as a digital printer for printing an image onto a photographic paper and developing it by laser, LED and the like, a sublimating type printer, an ink-jet printer and the like can be utilized in the print creating section 40.

The image processing system 26 in the illustrated case also includes a medium output section 40a for outputting image data recording media such as MO, FD, smart media and ZIP on which the image data processed in the image processing section 38 is recorded; and a network delivery section 40b for delivering the processed image data through a communication network such as Internet. This is not however the sole case of the present invention, and the image processing system 26 need only be provided with one of the print creating section 40, the medium output section 40a and the network delivery section 40b.

Further, reference numeral 44 denotes a photographing information reading section for turning on the communication device 12 or 12a such as the transmitter/receiver or transmitter of a user and reading the photographing information recorded therein including the identification number (ID number); reference numeral 46 denotes an image search section for searching the image corresponding to the identification number included in the photographing information read by the photographing information reading section 44;

reference numeral 48 denotes a monitor for displaying the image searched by the image search section 46; reference numeral 42 denotes a manipulating section for designating an image to be printed, an editing method and the like; and reference numeral 50 denotes a controller (CPU/memory) for controlling the image processing system 26 as a whole.

Figure 7:
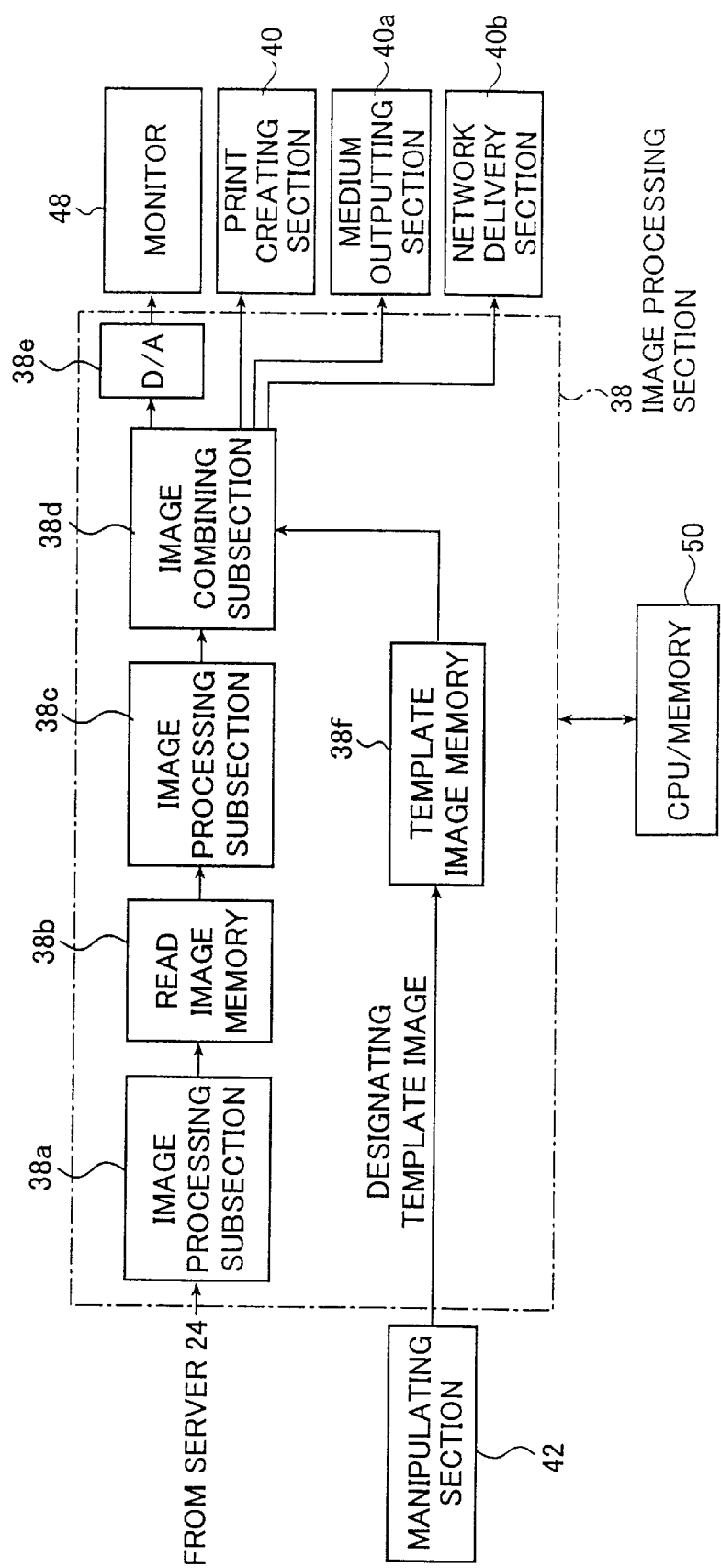
FIG. 7 is a block diagram showing the detailed arrangement of an example of the image processing section shown in FIG. 6.

FIG. 7 shows the detailed arrangement of an example of the image processing section 38. As shown in FIG. 7, the image processing section 38 includes an image preprocessing subsection 38a, a read image memory (frame memory) 38b, an image processing subsection 38c, an image combining subsection 38d, a D/A converter 38e, and a template image (background image) memory 38f. It should be noted that reference numeral 50 denotes a CPU/memory constituting the above-mentioned controller. The template image memory 38f may be formed in the memory of the controller 50.

The image preprocessing subsection 38a subjects, as required, the (digital) image data received from the server 24 or directly from the photographing unit 14 to various kinds of correction processing such as offset correction, Log conversion, shading correction, and the like. The read image memory 38b stores the image data having been subjected to the above preprocessing. The image processing subsection 38c creates the density histogram of the image data obtained in the above processing and calculates an image characteristic amount to thereby set image processing conditions such as color/gradation correction, magnification correction, sharpness correction and the like.

The image processing subsection 38c subjects the image data to image processing in accordance with the thus set image processing conditions. In the image processing carried out in the image processing subsection 38c, an image is longitudinally or laterally rotated or reversed, the color and/or the gradation of the image is corrected, then the image is magnified or reduced in accordance with a set magnification, and thereafter the image is subjected to sharpness processing by unit of an unsharpness mask or the like, when necessary.

The image having been processed in the image processing subsection 38c is combined with a template image in the image combining subsection 38d when necessary and then displayed on the monitor 48 as a composite image.

The template image to be combined is read from the template image memory 38f based on the designation (selection) made by the user through the manipulating section 42.

The template image memory 38f stores the digital image data of background images (also referred to as photograph mount images) used in various kinds of commemorative photographing and the bitmap image data of a plurality of types of fixed-format characters and fixed-format sentences. These data are read out from the template image memory 38f under the control of the controller 50 by being designated by the user through the manipulating section 42 as described above.

It is preferable that the digital cameras 16a in the photographing units 14, 14a and 14b shown in FIGS. 3–5 be digital cameras having a capacity of at least so-called mega-pixels, and it is also preferable that they have functions which are unique to a digital camera such as an automatic exposure control (AE) function, an automatic focusing (AF) function, a remote control photographing function, and further an automatic white balance (AWB) function, and the like. Further, the monitor 28 of the photographing unit 14b shown in FIG. 5 is used only to display an image (more correctly, an image having been subjected to appropriate image processing) taken with the digital camera 16a and is not always necessary.

The image processors 30, 30a and 30b are not always necessary, but when they are provided, the images taken with the digital cameras 16a are subjected to the conversion processing mentioned above and other image processing such as gradation adjustment processing, density adjustment processing, pixel density conversion for adjusting the image in accordance with a print size, and the like.

The communication controllers 32 in the photographing units 14, 14a and 14b and the communication controller 36 in the image processing system 26 control the transmission and reception of various types of information such as identification number (ID information) and photographing information, and image data of the photographed image between the photographing units 14, 14a and 14b and the server 24, between the image processing system 26 and the server 24, between the photographing unit 14 and the image processing system 26 and the like.

It is needless to say that the communication may be carried out by radio.

Specifically, it is preferable that relatively independent areas in a theme park and the like be laid with so called LAN (local area network) or the like to thereby connect a plurality of the photographing units 14, 14a and 14b . . . to the server 24 and the image processing system(s) 26. The above-mentioned communication controllers 32 and 36 have a function of communication between respective points connected to the LAN.

The image processing section 38 has functions of setting image processing conditions from the image data obtained by the digital cameras 16a in the photographing units 14, 14a and 14b (or resulting image data obtained by subjecting the above image data to image processing in the above-mentioned image processors 30, 30a and 30b), subjecting the image data to image processing in accordance with the set conditions to thereby produce output image data for image recording, further editing and combining the output image data if necessary, and supplying the output image data to the print creating section 40.

Ordinarily, color balance adjustment, contrast correction (gradation processing), brightness correction, dodging (compression/expansion of the dynamic range of densities), saturation correction, sharpness processing, red-eye correction when photographing is carried out using an electronic flash, and the like are carried out as the above-mentioned image processing. These processing schemes are carried out by appropriately combining an arithmetic operation by an operation formula, a processing arithmetic operation by LUT (look-up table), a matrix (MTX) operation, a processing arithmetic operation by a filter, and the like.

In the image providing system according to the embodiment under consideration, when a user enters a theme park, he or she receives the transmitter/receiver or transmitter (that is, the communication device 12 or 12a mentioned above) to which photographing information having a different identification number (ID information) is registered. The identification number is used when the user utilizes facilities including the image providing system according to the embodiment under consideration.

Here, although different identification numbers (ID information) may be assigned to the respective communication devices supplied to the users, identical ID information may be assigned to members of a family, a couple, members of a group, or the like. Preferably, ID information assigned to members of a group is partly in common and partly individualized to discriminate the respective users. This makes it possible for a user to obtain photographs of other users in the same group, children in the same family or the like even if the user himself or herself is not in the photographs.

Next, the communication devices 12, 12a, 18, and 18a used in the image photographing system and the image providing system according to the present invention are described further in detail.

Figure 8:
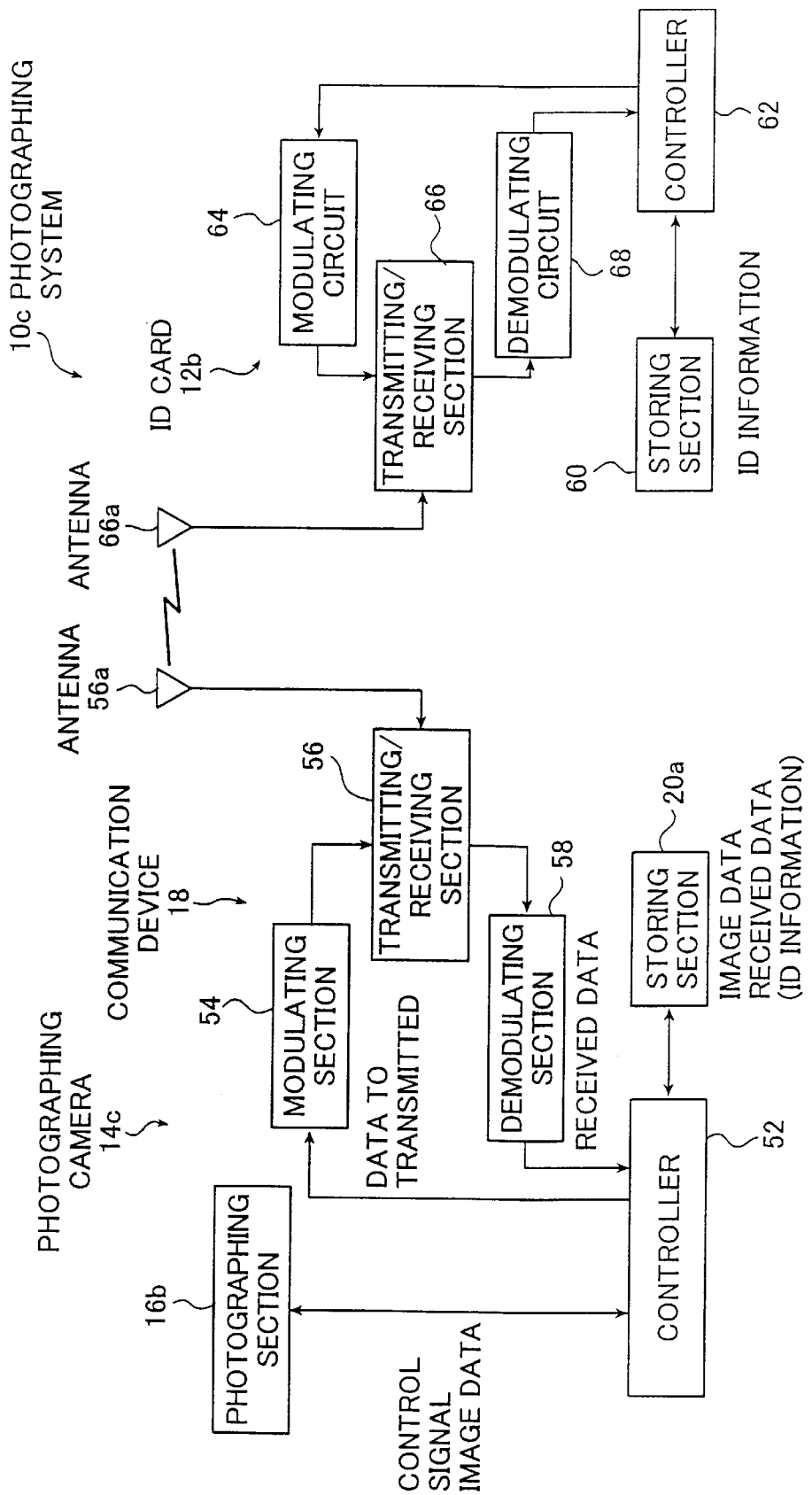
FIG. 8 is a block diagram showing the detailed arrangement of an embodiment of the photographing system according to the present invention.

First, FIG. 8 is a block diagram showing the structure of a circuit of an embodiment of a photographing system 10c with the two-way communication devices 12 and 18 incorporated therein.

As shown in FIG. 8, the photographing system 10c has an ID card 12b functioning as the two-way communication device 12, and a photographing camera 14c functioning as the photographing unit 14.

The photographing camera 14c has the two-way communication device 18, a photographing section 16b formed of a photographing device such as a digital camera, a storing section 20a formed of an image memory and the like, and a controller 52 for controlling the communication device 18, the photographing section 16b and the storing section 20a. The communication device 18 has a modulating section 54 for modulating data to be transmitted such as query information, a transmitting/receiving section 56 and an antenna 56a for transmitting to the ID card 12b data to be transmitted which was modulated by the modulating section 54 and for receiving modulated data such as ID information which was transmitted from the ID card 12b, and a demodulating section 58 for demodulating modulated data such as ID information which was received by the transmitting/receiving section 56.

On the other hand, the ID card 12b has a storing section 60 for storing registered ID information and the like, a controller 62 for reading from the storing section 60 ID information or the like in response to query information or the like from the photographing camera 14c, a modulating circuit 64 for modulating ID information or the like received from the controller 62, a transmitting/receiving section 66 and an antenna 66a for transmitting data to be transmitted such as ID information which was modulated by the modulating circuit 64 and for receiving modulated data such as query information which was transmitted from the photographing camera 14c, and a demodulating circuit 68 for demodulating modulated data such as query information which was received by the transmitting/receiving section 66.

Here, the controller 62 controls the storing section 60, the modulating circuit 64, the transmitting/receiving section 66, and the demodulating circuit 68.

In the photographing camera 14c of the photographing system 10c, the controller 52 sends query information or the like to the modulating section 54 as data to be transmitted. The modulating section 54 modulates the query information or the like sent from the controller 52 into modulated data to be transmitted and sends it to the transmitting/receiving section 56. The transmitting/receiving section 56 transmits from the antenna 56a the modulated query information or the like at predetermined intervals.

On the other hand, when a user carrying the ID card 12b around enters the region where the photographing camera 14c can take a photograph, the transmitting/receiving section 66 of the ID card 12b receives at its antenna 66a modulated query information or the like transmitted from the antenna 56a of the transmitting/receiving section 56 of the photographing camera 14c.

In the ID card 12b, the transmitting/receiving section 56 sends to the demodulating circuit 68 the modulated query information or the like received by the antenna 66a. The demodulating circuit 68 demodulates the modulated query information or the like which was received and sends it to the controller 62 as query information or the like. The controller 62 reads registered ID information or the like stored in the storing section 60 in response to the query information or the like which was received from the photographing camera 14c, and sends it to the modulating circuit 64. The modulating circuit 64 modulates the ID information or the like which was received, and sends it to the transmitting/receiving section 66. The transmitting/receiving section 66 transmits the modulated ID information or the like from the antenna 66a toward the photographing camera 14c.

In the photographing camera 14c, when the transmitting/receiving section 56 receives at its antenna 56a the modulated ID information or the like which was transmitted from the ID card 12b, the transmitting/receiving section 56 sends to the demodulating section 58 the modulated ID information or the like which was received. The demodulating section 58 demodulates the modulated ID information or the like which was received into ID information or the like, and sends it to the controller 52 as received data. When the controller 52 receives the ID information or the like from the ID card 12b, the controller 52 sends to the photographing section 16b a control signal instructing to photograph and retains the ID information or the like. When the photographing section 16b receives the control signal instructing to photograph, the photographing section 16b photographs the user carrying the ID card 12b around, and sends the image data of the photographed image back to the controller 52. The controller 52 makes the storing section 20a store the received image data in association with the ID information or the like as received data which was previously received and retained.

In this way, the storing section 20a stores the image data associated with the ID information or the like of the user.

Figure 9:
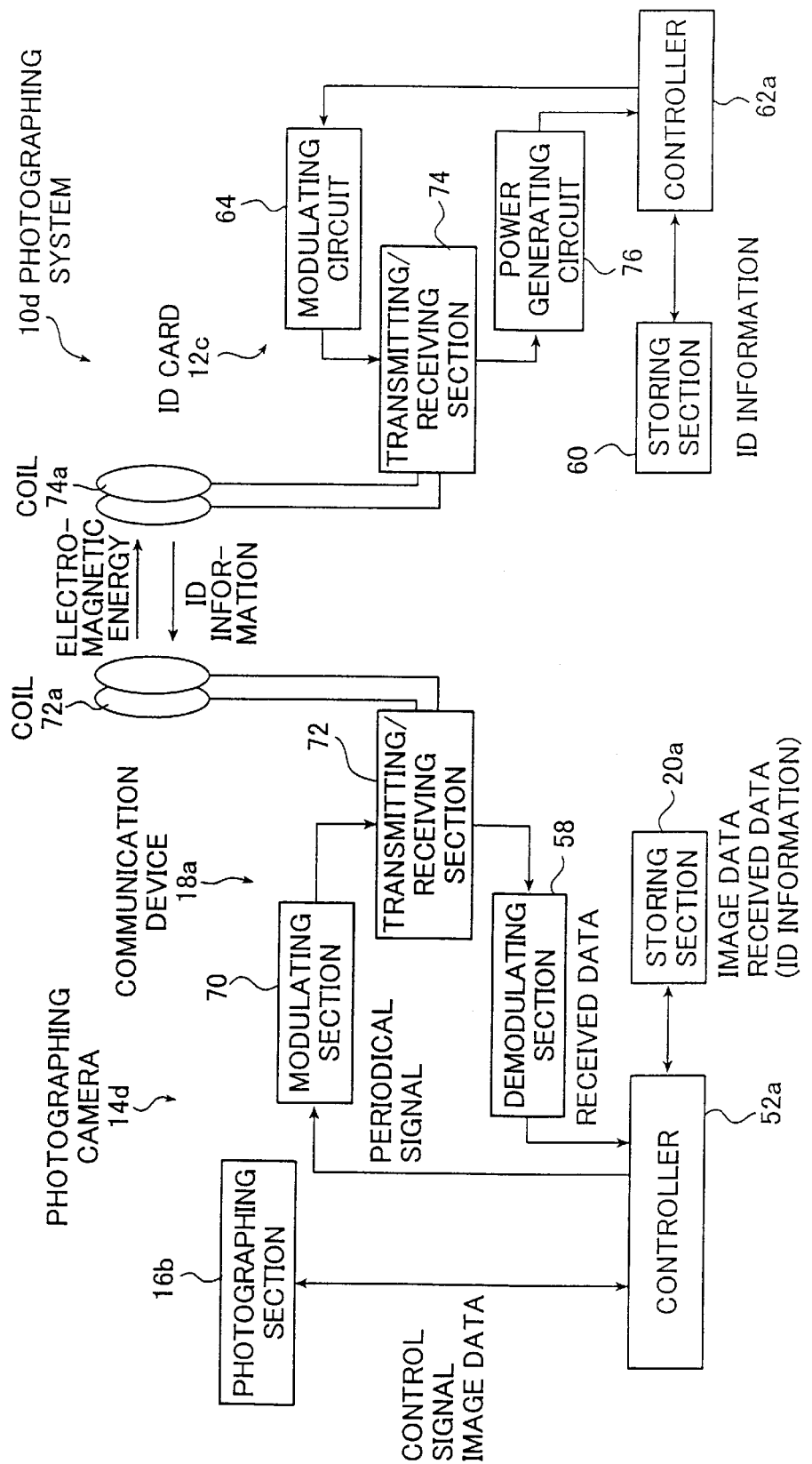
FIG. 9 is a block diagram showing the detailed arrangement of another embodiment of the photographing system according to the present invention.

FIG. 9 is a block diagram of an embodiment of a photographing system 10d with a one-way communication device 12a for transmitting and a one-way communication device 18a for receiving incorporated therein.

It is to be noted that the photographing system 10d shown in FIG. 9 is similar in structure to the photographing system 10c shown in FIG. 8 except that, differently from the case of the photographing system 10c where the ID card 12b receives the query information or the like transmitted by the photographing camera 14c and transmits the ID information or the like, a photographing camera 14d of the photographing system 10d emits electromagnetic wave having electromagnetic energy from a coil 72a of a transmitting/receiving section 72, an ID card 12c receives the emitted electromagnetic wave at a coil 74a of a transmitting/receiving section 74 to generate induced current, a power generating circuit 76 generates electric power, and, as long as the electric power remains, circuits of the ID card 12c are driven to continue to transmit the ID information or the like. Accordingly, like reference numerals designate like elements and the description thereof is omitted.

The photographing system 10d shown in FIG. 9 has the ID card 12c functioning as the one-way communication device 12a for transmitting and the photographing camera 14d functioning as a photographing unit having the one-way communication device 18a for receiving. The photographing camera 14d has the communication device 18a, a photographing section 16b, a storing section 20a, and a controller 52a for controlling the communication device 18a, the photographing section 16b, and the storing section 20a. The communication device 18a has a modulating section 70 for receiving a periodical signal from the controller 52a and for generating a modulation signal for generating electromagnetic wave having electromagnetic energy to be emitted toward the ID card 12c, the transmitting/receiving section 72 and the coil 72a also functioning as an antenna which are both used for emitting toward the ID card 12c the electromagnetic wave generated by receiving the modulation signal generated by the modulating section 70 and for receiving the modulated data such as the ID information transmitted from the ID card 12c, and a demodulating section 58 for demodulating the modulated data such as the ID information which was received by the transmitting/receiving section 72 via the coil 72a.

The ID card 12c has a storing section 60, a controller 62a, a modulating circuit 64, the transmitting/receiving section 74 and the coil 74a also functioning as an antenna which are both used for transmitting data to be transmitted such as ID information which was modulated by the modulating circuit 64 and for receiving the electromagnetic wave having electromagnetic energy which was emitted from the photographing camera 14c to generate the induced current, and the power generating circuit 76 for receiving via the transmitting/receiving section 74 the induced current generated at the coil 74a to generate electric power for driving the storing section 60, the controller 62a, the modulating circuit 64, and the transmitting/receiving section 74 of the ID card 12c.

Here, the controller 62a controls the storing section 60, the modulating circuit 64, the transmitting/receiving section 74, and the power generating circuit 76.

In the photographing camera 14d of the photographing system 10d, the controller 52a sends a periodical signal to the modulating section 70. The modulating section 70 modulates the periodical signal sent from the controller 52a into a modulation signal and sends it to the transmitting/receiving section 72. The transmitting/receiving section 72 emits the modulation signal from the coil 72a as the electromagnetic wave having electromagnetic energy.

On the other hand, when a user carrying the ID card 12c around enters the region where the photographing camera 14d can take a photograph, the coil 74a of the ID card 12c receives the electromagnetic wave emitted from the coil 72a of the transmitting/receiving section 72 of the photographing camera 14d to generate the induced current.

In the ID card 12c, the induced current generated at the coil 74a flows through the transmitting/receiving section 74 to the power generating circuit 76. The power generating circuit 76 generates electric power in accordance with the induced current to drive circuits of the ID card 12c such as the controller 62a, the modulating circuit 64, the transmitting/receiving section 74, and the storing section 60. The activated controller 62a reads registered ID information or the like stored in the storing section 60, and sends it to the modulating circuit 64. The modulating circuit 64 modulates the ID information or the like which was received, and sends it to the transmitting/receiving section 74. The transmitting/receiving section 74 transmits the modulated ID information or the like from the coil 74a toward the photographing camera 14d. It is to be noted that, as long as the electric power generated by the power generating circuit 76 remains, the transmitting/receiving section 74 continue to transmit the modulated ID information or the like toward the photographing camera 14d.

In the photographing camera 14d, when the transmitting/receiving section 72 receives at the coil 72a the modulated ID information or the like which was transmitted from the ID card 12c, the transmitting/receiving section 72 sends to the demodulating section 58 the modulated ID information or the like which was received. The demodulating section 58 demodulates the modulated ID information or the like which was received into ID information or the like, and sends it to the controller 52a as received data. When the controller 52a receives the ID information or the like from the ID card 12c, similarly to the case of the controller 52 of the photographing camera 14c, the controller 52a sends to the photographing section 16b a control signal instructing to photograph. The photographing section 16b photographs the user carrying the ID card 12c around, and sends back the image data of the photographed image. The controller 52a makes the storing section 20a store the image data in association with the ID information or the like.

In this way, the storing section 20a stores the image data associated with the ID information or the like of the user.

It is to be noted that, in the image photographing system 10d described in the above, as long as the electric power generated by the power generating circuit 76 of the ID card 12c remains, the modulated ID information or the like continues to be transmitted from the ID card 12c toward the photographing camera 14d. However, the present invention is not limited thereto. It may be that, in the ID card 12c, a battery is disposed instead of the power generating circuit 76, antennas are provided instead of the coils 72a and 74a, a receiving section and a transmitting section are provided instead of the transmitting/receiving sections 72 and 74, respectively, and the modulating section 70 is removed such that the ID card 12c always transmits the modulated ID information or the like and the photographing camera 14d only receives the modulated ID information or the like. It is needless to say that, with regard to the above-described image photographing system 10c also, the ID card 12b may always transmit the modulated ID information or the like and the photographing camera 14c may only receive the modulated ID information or the like.

Further, the image photographing systems 10c and 10d may be used instead of or together with the above-described image photographing system 10, 10a, or 10b in the image providing system 22.

The image photographing system, the image processing system, the image providing system connecting them, and the photographing camera are basically structured as described in the above.

The operations of the image photographing system and the image providing system according to the embodiment arranged as described above will be described below.

Figure 10:
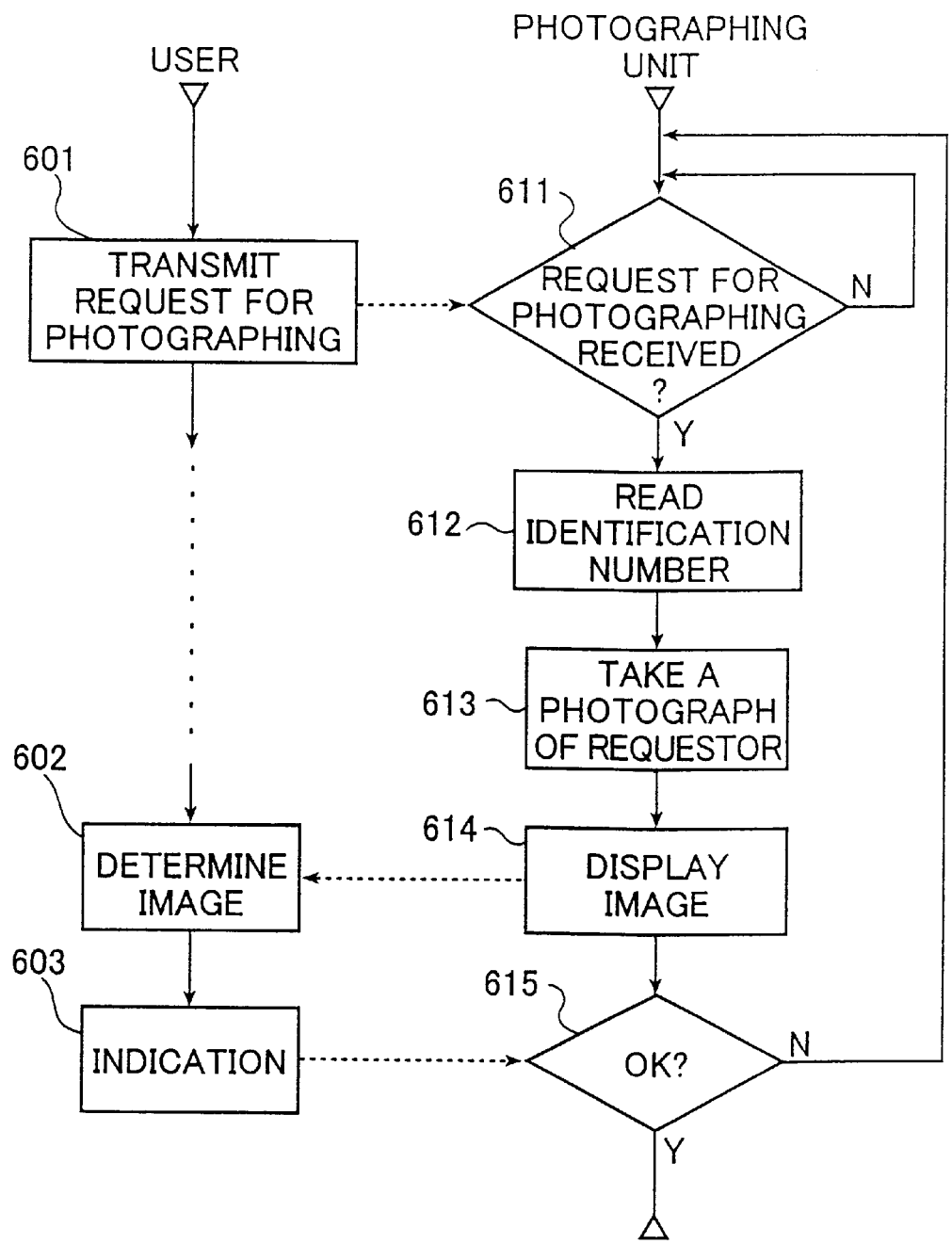
FIG. 10 is an operation flowchart as to the manipulation executed by a user in an embodiment of the photographing system shown in FIG. 2 and the corresponding operation of the photographing unit.

First, FIG. 10 shows a flowchart relating to an exemplary photographing operation including the manipulation executed by a user in the communication device 12a of the photographing system 10a shown in FIGS. 2 and 5 and the corresponding operation of the photographing unit 14b. An example of the photographing operation in the photographing system 10b will be described below with reference to FIGS. 2, 5, 6 and 10.

When the user finds through an information sign that he or she has reached "a photographing point where photographing is carried out in response to a request", he or she issues a request for photographing through the communication device 12a if he or she desires the photographing (step 601). The user requests the photographing by manipulating the communication device 12a to issue the above-mentioned photographing information including the identification number and other identification information. The photographing information is received by the receiver 18a of the photographing unit 14b (step 611). The photographing unit 14b reads the identification number of the requester (user) from the received information (step 612) and takes a photograph of the requester by the digital camera 16a (step 613). The requester is not the sole object of the image to be taken with the digital camera 16a, but the image may include persons having a relation with the requester or animals. If confirmation is possible, the requestor may not be included in the image.

Then, a photographed image is displayed on the monitor 28 of the photographing unit 14b and the user is prompted to confirm the displayed image (step 614). In response to the prompt, the user determines whether or not the image is acceptable (step 602) and responds to the photographing unit 14b for the result of determination (indication) (step 603). When it is determined by the user that the image is acceptable, the photographing unit 14b transmits the image data of the image and the photographing information including the identification number and other information of the user to the server 24.

It should be noted that the photographing unit 14b may be arranged to execute the above-mentioned steps 611 to 615 again to cope with such a case that the user is not satisfied with the image photographed that time and desires to perform photographing again (re-photographing).

When the photographing (which is satisfactory to the user) has been completed (step 615), the photographing unit 14b transmits the image data and the photographing information including the identification information and other information of the user to the server 24.

The server 24 records the received image data and identification number by relating them to each other to permit the image search section 46 in the image processing system 26 shown in FIG. 6 to search and output image data having the same identification number using the identification number as a search key afterward.

With this operation, preparations have been completed to permit the user to input his or her identification number to the image processing system 26 in the center through the communication device 12 or 12a at the user reception window provided in the center and to obtain the image transmitted from the photographing unit 14b and stored in the server 24 through the image processing system 26 in the form of a photographic print, image data of an image data recording medium or image data to be delivered through network afterward.

Figure 11:
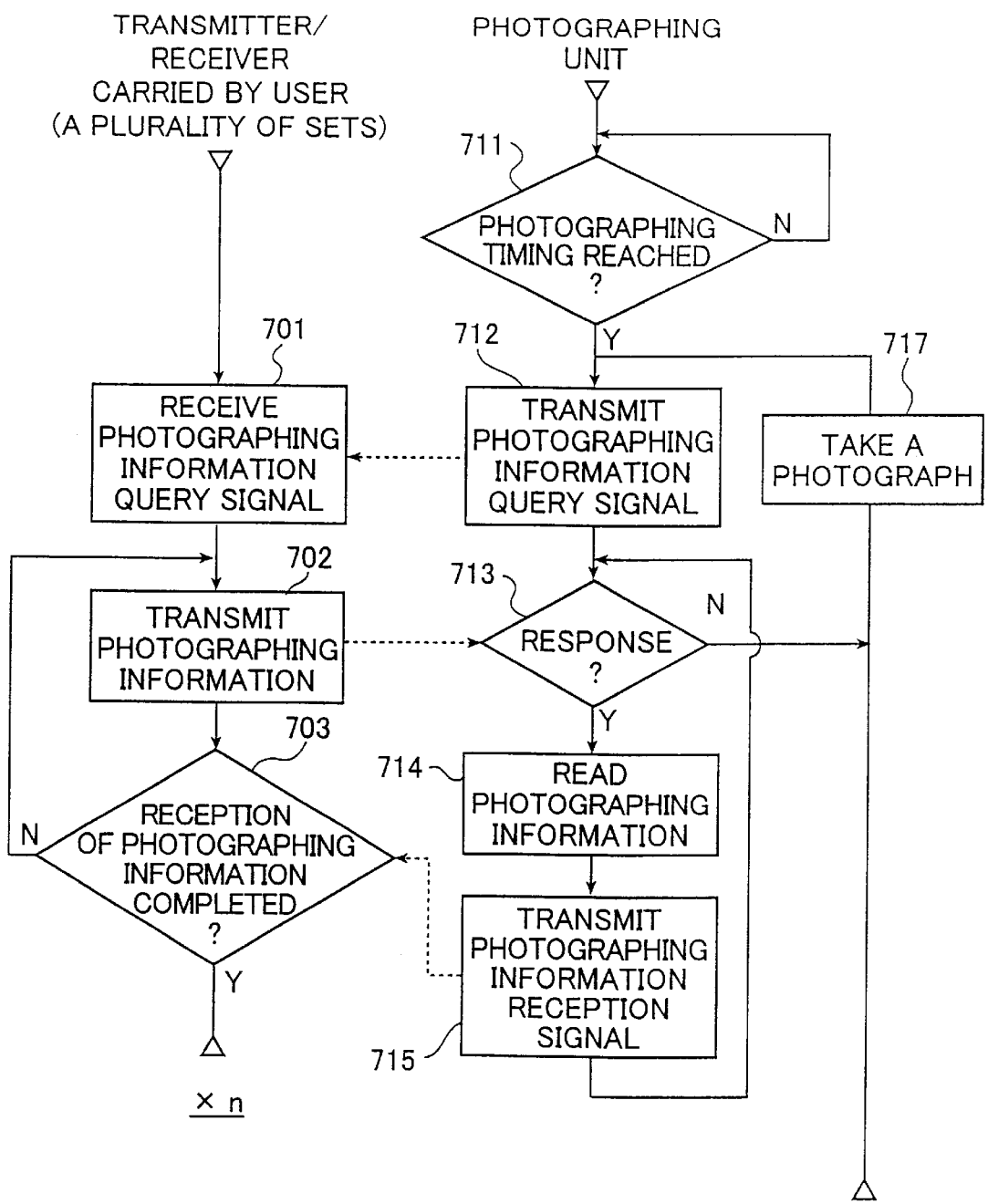
FIG. 11 is an operation flowchart of the operation executed between the user and the photographing unit in another embodiment of the photographing system shown in FIG. 2.

Next, FIG. 11 shows a flowchart relating to an exemplary photographing operation including the manipulation executed by a user in the communication device 12 of the photographing system 10a shown in FIGS. 2 and 4 and the corresponding operation of the photographing unit 14b. The operation performed between a user (communication device 12) and the photographing unit 14a in the photographing system 10a, that is, a photographing operation carried out based on a query from the photographing unit 14a will be described with reference to FIGS. 2, 4, 6 and 11.

The feature of the operation carried out by the photographing unit 14a resides in that a query as to photographing information is issued from the communication device 18 of the photographing unit 14a to the communication device 12 of the user at the point where the photographing unit 14b is installed, and photographing information is transmitted from the communication device 12 of the user to the communication device 18 of the photographing unit 14a in response to the query and obtained (recorded) thereby. It should be noted that photographing in that case is carried out at a timing preset in the photographing unit 14a.

That is, the photographing unit 14a monitors whether or not photographing timing has reached, that is, whether or not the vehicle of an attraction has arrived at a predetermined photographing point (step 711), and when the predetermined photographing timing has reached, the photographing unit 14a carries out predetermined photographing (step 717) as well as inquires of the user about photographing information using the communication device 18 (step 712).

The communication device 12 of the user having received the query (step 701) instantly transmits the photographing information including the identification number of the user (step 702). If a photographing information receipt signal is not transmitted from the photographing unit 14a at that time, the communication device 18 repeats the transmission of the photographing information the predetermined number of times (step 703).

The photographing unit 14a monitors the response from the communication device 12 of the user (step 713), and when the response is transmitted, the photographing unit 14a reads the photographing information of the user from the content of the communication (step 714) and transmits the photographing information receipt signal to the communication device 12 of the user (step 715). The photographing information receipt signal is arranged as a signal including the received identification number, with which it is notified to a particular communication device 12 among a multiplicity of communication devices 12 that the reception of the information has been completed. It should be noted that, while there are ordinarily responses from the communication devices 12 of a plurality of users at one photographing point, the photographing unit 14a completes processing at a time when no response is issued from the communication device 12 of a next user.

The photographing unit 14a transmits the above-mentioned image data and the photographing information including the identification number and other information of the user to the server 24. The server 24 records the received image data and identification number by relating them to each other to permit the image search section 46 in the image processing system 26 shown in FIG. 6 to search and output image data having the same identification number using the identification number as a search key afterward as described above.

With the above operation, preparations have been completed to permit the user to input his or her identification number to the image processing system 26 in the center through the communication device 12 or 12a at the user reception window provided in the center and to obtain the image transmitted from the photographing unit 14a and stored in the server 24 in the form of a print or the like afterward, similarly to the above case.

As described above, the image data obtained as a result of the photographing carried out by the respective photographing units 14, 14a, 14b . . . at respective photographing points and the photographing information corresponding to the image data are stored in the image memory 24a of the server 24.

FIG. 12 is a table exemplifying the above state in which recorded are various types of photographing information, that is, a photographing date and time, a photographing number of each photographing point (photographing system number), photographing conditions, user information (identification number of a communication device), and the like in the sequence of photographing times. It should be noted that the above data may be arranged in a sequence other than the above.

The photographing number of each photographing point corresponds to each image data so that the photographing number is used when the image processing system 26 searches target image data from the photographing number corresponding to user information by performing search using the user information in the above-mentioned photographing information as a key as described later.

In FIG. 12, reference numeral (a) shows an example of a record corresponding to photographing performed based on the user information from the communication device carried by one user, and reference numeral (b) shows an example of a record corresponding to photographing performed based on user information from the communication devices carried by a plurality of users. There is one piece of user information which corresponds to one photographing number in (a), whereas there are two pieces of user information which correspond to the one photographing number in (b).

Next, the operation carried out between a user and the image processing system 26 will be described. The description will be continued supposing that a reception terminal is disposed at the user reception window in the center which is provided together with the image processing system 26.

A user visits the user reception window in the center having the image providing system 22 and sets the communication device 12 or 12a to the reception terminal (photographing information reading section 44) of the image processing system 26. When the photographing information reading section 44 reads the photographing information stored in the communication device 12 or 12a, the image search section 46 searches the images, which correspond to the identification number included in the photographing information, from the images stored in the server 24.

Next, the searched image is displayed on the monitor 48 in the image processing system 26. Any appropriate methods such as a method of displaying a plurality of images in an index form, a method of selecting a template based on a photographing location managed by the system and displaying the searched image combined therewith, and the like may be used as the method of displaying the searched image. The user observes the displayed images, determines (selects) necessary images and their format, and requests print creation.

FIG. 13A shows an exemplary image display. The images collected in the figure correspond to the identification number of one user. These images, which were photographed at respective photographing points, are displayed in the form of a list. As described above, a user (or a representative of a group) performs selection from the displayed images, further designates the disposition, design and the like thereof, and requests to create the prints thereof. The image processing system 26 creates the prints of the necessary images based on the request from the user using the print creating section 40.

It should be noted that when a plurality of users participate in one photographing, for example, when users enter a theme park as a group as described above, it is also possible to input the identification numbers which correspond to the number of the users, who desire to participate in the photographing, from the photographing unit 14a or 14b to the image processing system 26 and to subject the identification numbers to correspondence provision processing in the image processing system 26 in one operation.

With this operation, when three identification numbers, for example, are input in the creation of prints, the images photographed in relation to the three identification numbers are displayed, from which necessary images can be selected. That is, it is possible to create a photograph on which the three persons are printed. FIG. 13B shows the above case in an example.

In FIG. 13B, reference numerals 101 and 102 show the images corresponding to the identification number of a user A, reference numerals 103 and 104 show the images corresponding to the identification number of a user B, and reference numerals 105 and 106 show the images corresponding to the identification number of a user C. These composite images cannot be conventionally obtained.

While the output format in the image processing system 26 was a print in the above description, it is preferable that the image processing system 26 can also cope with other output format such as an output by an image data storage medium from the medium output section 40a, or an image delivery from the network delivery section 40b through Internet.

Further, it is also possible not to request a print at the time photographing is carried out but to record an identification number and to request to output an image later as described below.

According to the above embodiment, even if many automatic photographing apparatuses are installed in a wide site such as a theme park, they perform photographing autonomously, respectively, from which an advantage can be obtained in that an effective automatic image providing system, which is convenient for users as well as time and labor saving for the owner of the system, can be run.

It is needless to say that the above embodiment shows an example of the present invention and the present invention is not limited thereto.

For example, while the photographing units 14a, 14b and the like do not particularly have a storage device for photographed image and all the information of the photographed image is transmitted to and stored in the server 24 in the above embodiment, the photographing units 14a and 14b may be provided with a storage device as in the photographing unit 14 depending upon the scale of the image providing system.

Further, while the above embodiment shows only the example in which the identification information registered in the communication devices 12, 12a, 12b and 12c carried by a user is used as the photographing information to be transmitted from the communication devices 12, 12a, 12b and 12c to the photographing units 14, 14a, 14b, 14c and 14d, the property (name, age, the distinction of sex and the like) of the user carrying the communication devices 12, 12a, 12b and 12c may be included in addition to the identification information. In this case, the abovementioned property of the user may be displayed in relation to respective prints.

Further, if a user desires, such a service can be easily realized that, for example, the user brings a ticket, on which an identification number is recorded, home once and transmits the identification number from his or her personal computer through a network so that an image stored in the server 24 can be output in a desired format at an arbitrary location such as a neighboring photo shop or the like.

A preferable application of the photographing units 14, 14a, and 14b and the photographing cameras 14c and 14d used in the image photographing systems 10, 10a, 10b, 10c, and 10d and the image providing system 22 described in the above is that they are fixedly installed on premises such as of an amusement park, a theme park, a field, and an area for special events, and they are systematized on a large scale together with a large number of the communication devices 12 and 12a and the ID cards 12b and 12c carried by users. However, the present invention is not limited thereto, and may also be applied to a system of portable photographing camera assemblies as photographing units and card-type communication devices. For example, the photographing cameras 14c and 14d are suitable as such portable photographing cameras and the ID cards 12b and 12c are suitable as such card-type communication devices in the image photographing systems 10c and 10d, respectively.

These image photographing systems 10c and 10d may also be applied to photographing a group photograph and a photograph in sightseeing in a group tour, sightseeing in a group, a ceremony or event in a group (hereinafter collectively referred to as a group tour), or the like, and to editing of an album, preparation of an order sheet for each object thereafter and the like. More specifically, by making in advance members of a group tour or the like carry the ID card 12b or 12c around and by carrying the photographing camera 14c or 14d and photographing the members, the image photographing system 10c or 10d can be structured. It is to be noted that the ID information registered in the ID card 12b or 12c preferably includes identification information for specifying the group tour, the sightseeing, the ceremony or event in a group, or the like as well as an ID code and an ID number.

By this, photographing using the photographing camera 14c or 14d can be carried out in the image photographing system 10c or 10d as described in the above.

Of course, in photographing such a group photograph and a photograph in sightseeing also, the photographing camera 14c or 14d may be disposed as a photographing unit of a fixed type as described in the above, or, the photographing system 10, 10a, 10b, or the like may be structured with the photographing unit 14, 14a, or 14b fixedly disposed and with the ID card 12b or 12c or the communication device 12 or 12a being carried by the members.

In this way, image data of a plurality of objects photographed with the photographing camera 14c or 14d is stored in the storing section 20a together with the photographing information including the ID information or the like of the objects concerned. Alternatively, the images of the plurality of objects and the photographing information including their ID information or the like may be stored in the image memory 20 of the photographing unit 14 or in the image memory 24a of the server 24.

Using the images of the plurality of objects and the photographing information including their ID information or the like stored in the storing section 20a or the image memory 20 or 24a, image editing for creating an album or for preparing order sheets for the respective members (objects) can be carried out.

Figure 14:
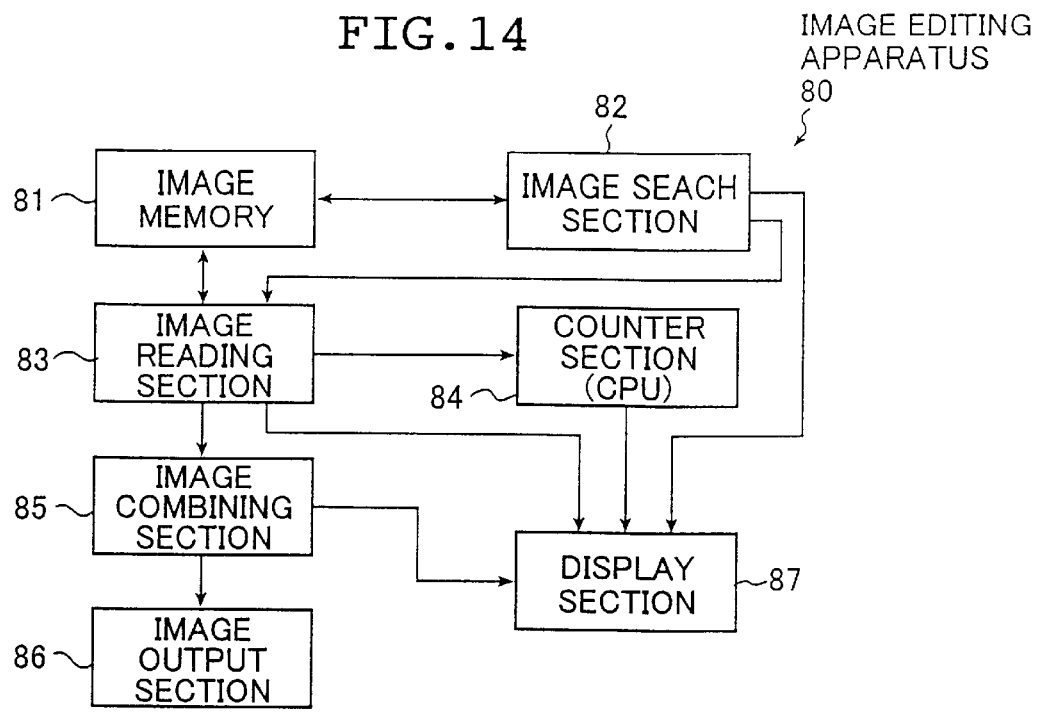
FIG. 14 is a block diagram showing the schematic arrangement of an embodiment of the image editing apparatus according to the present invention.
Figure 15:
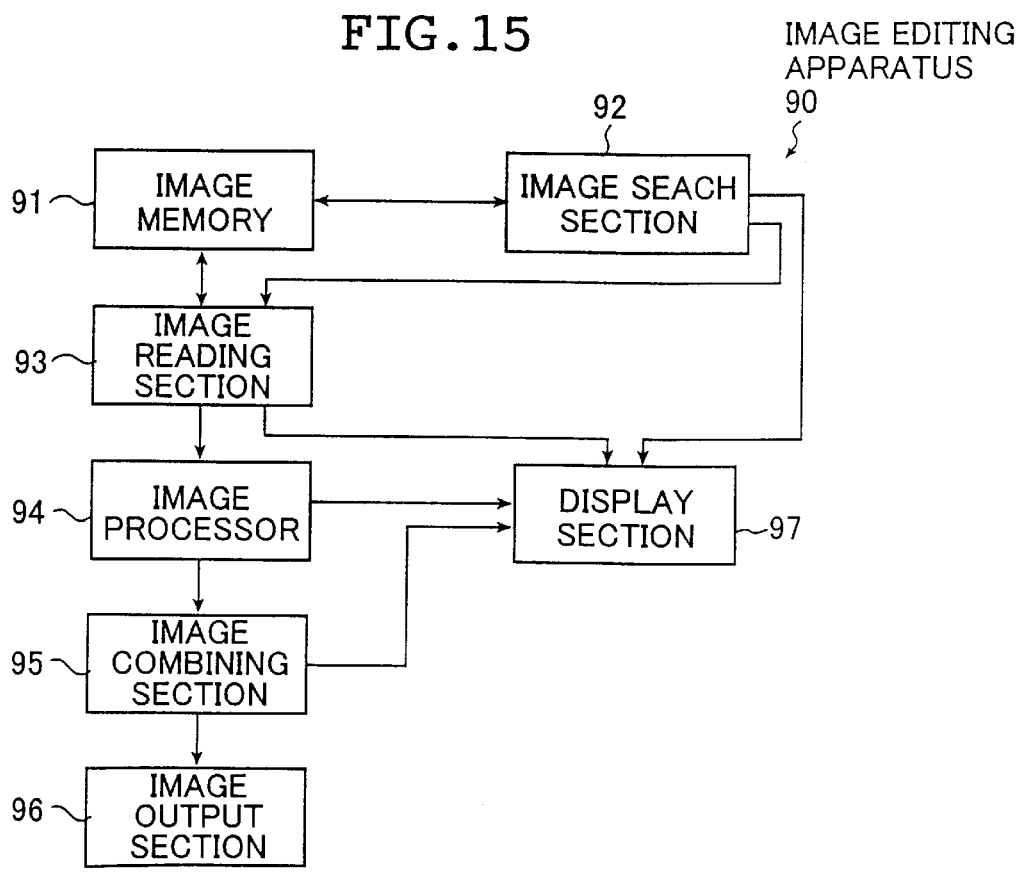
FIG. 15 is a block diagram showing the schematic arrangement of another embodiment of the image editing apparatus according to the present invention.

An embodiment of an image editing apparatus for carrying out such image editing according to the present invention is shown in FIGS. 14 and 15.

As shown in FIG. 14, an image editing apparatus 80 according to the present invention is an image editing apparatus for an album preparing apparatus for editing images in creating an album, and has an image memory 81, an image search section 82, an image reading section 83, a counter section 84, an image combining section 85, an image output section 86, and a display section 87.

Here, images of a plurality of objects and photographing information including their ID information or the like stored in the storing section 20a or the image memory 20 or 24a have been read by a conventional device and stored in the image memory 81. It is to be noted that image data stored in the image memory 81 is preferably image data after image processing necessary for image output.

The image search section 82 performs search in the image memory 81 using identification information of a group tour and ID information of a particular member (object) of the group tour and extracts images concerned (hit images).

The image reading section 83 reads from the image memory 81 the image data of the images extracted by the image search section 82 and the photographing information (including the ID information) associated therewith. It is to be noted that the image reading section 83 may read only image data of images selected for creating the album and their photographing information.

The counter section 84 counts the frequency of appearance (that is, the number of photographs) of the respective objects in these images selected for creating the album. Here, the counter section 84 may also serve as the controller (CPU) of the image editing apparatus 80.

When the number of photographs of the respective objects (the respective members) counted by the counter section 84 is the same, is substantially the same, or is in a predetermined range, the image combining section 85 edits the images (image data) selected for creating the album and read by the image reading section 83 for creating the album. For example, a plurality of photograph images are combined on a page of the album as they are, after enlargement or reduction, or after trimming. Further, if necessary, letters, a phrase, sentences, drawing, a character, or the like is combined thereto to prepare image data with regard to each page of the album. Here, particularly in case of a group photograph, it is preferable that the names of the respective objects are combined to be in the image concerned or outside the image concerned.

The image output section 86 outputs the images (image data) of the respective pages edited for the album as printed images (hard-copy images) over the full pages. Prints of the all the pages of the album outputted in this way are bound together into an album. It is to be noted that the image output section 86 is not limited to one which outputs the respective pages of an album as hard-copy images, and may deliver the data in the form of an image data recording medium with data including images of the respective pages of an album recorded thereon or may deliver the data on a network via communication unit such as the Internet.

The display section 87 is a monitor (display) for displaying the result of search by the image search section 82, a reproduced image of image data read by the image reading section 83 and its photographing information (such as its ID information), the result of counting by the counter section 84, a combined image on a page of an album form ed by the image combining section 85, and the like.

The image editing apparatus used for creating an album according to the present invention is basically structured as described in the above, and its action is described in the following.

Figure 16:
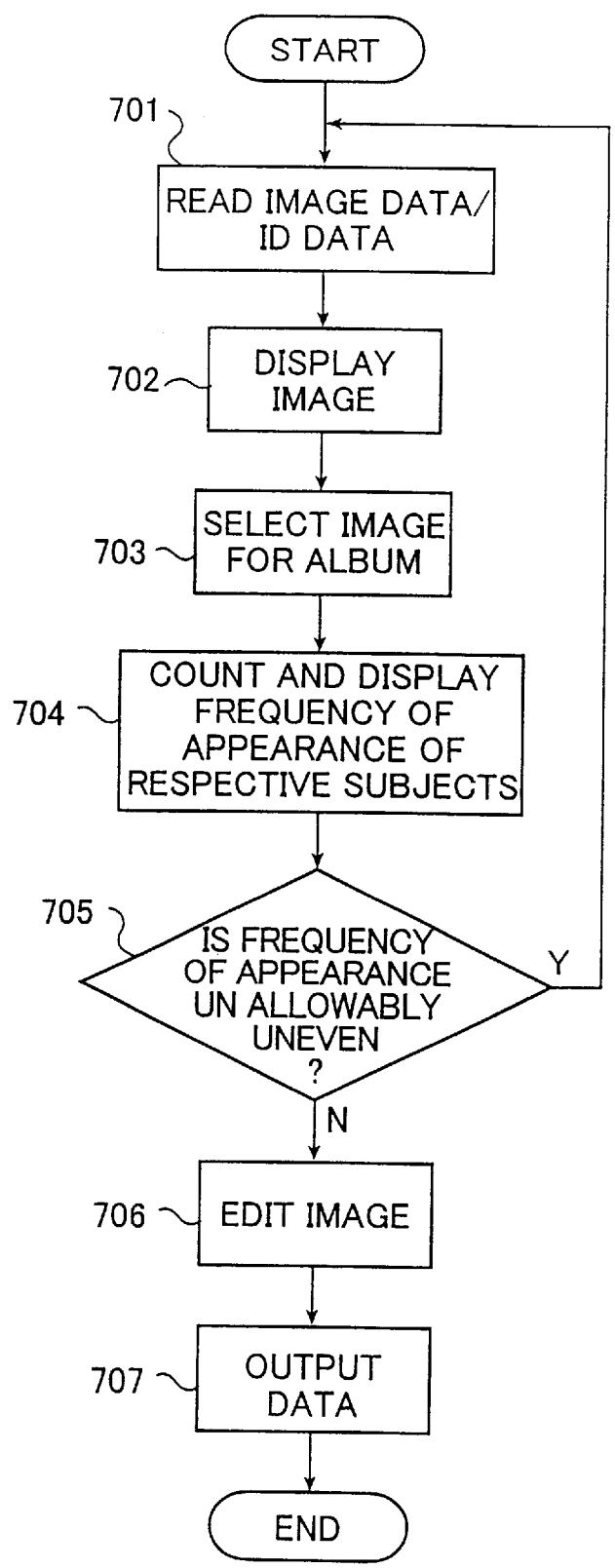
FIG. 16 is a flowchart showing an example of the image editing method for album creation in the image editing apparatus shown in FIG. 14.

FIG. 16 is a flow chart showing an example of a method of editing images for creating an album by the image editing apparatus 80 of FIG. 14.

First, at step 701 in FIG. 16, all the image data of a group tour for which an album is to be created and its photographing information including its ID data are read from the image memory 81 into the image reading section 83. Here, in case that the image data and its photographing information stored in the image memory 81 are with regard to images photographed of a plurality of group tours or the like, it is preferable that the image search section 82 performs search using a part of the photographing information representing the group tour concerned, extracts only the image data and its photographing information with regard to images photographed of the group tour concerned, and only the extracted image data and its photographing information are read by the image reading section 83. It is to be noted that the photographing information associated with an image of a group photograph includes ID data of a plurality of objects.

Next, at step 702, reproduced images photographed of all the image data read by the image reading section 83 are displayed on the display section 87. At step 703, an operator selects images to be used in creating the album from all the images photographed that are displayed. Here, it is preferable that a plurality of images photographed are reduced in size to be displayed at the same time on the display for the purpose of facilitating selection for the album while the respective images photographed which are selected can be enlargedly displayed for the purpose of confirmation. In this way, images for the album necessary for creating the album are selected.

After that, photographing information of the images selected for creating the album is sent to the counter section 84. At step 704, the counter section 84 counts a plurality of object ID data included in the photographing information of the image concerned, the frequency of appearance of the respective objects is counted with regard to all the images for the album, and the frequency of appearance is counted with regard to the respective objects. Then, the counted frequency of appearance with regard to the respective members is displayed on the display section 87.

Then, at step 705, the operator judges from the display of the frequency of appearance with regard to the respective objects whether the frequency of appearance is unallowably uneven or not. Though the frequency of appearance is preferably the same or substantially the same with regard to the respective objects, if the frequency of appearance is not unallowably uneven, the images can be used for the album. It is to be noted that the allowable range of the unevenness in the frequency of appearance is preferably set in advance.

As a result of the judgment, when the frequency of appearance is unallowably uneven (Y), the procedure goes back to the first step 701, and image data and its photographing information are read by the image reading section 81. Then, image display by the display section 87 at step 702, selection of images for the album at step 703, counting of the frequency of appearance with regard to the respective members by the counter section 84 and display of the result on the display section 87 at step 704, and judgment of the unevenness in the frequency of appearance with regard to the respective members at step 705 are performed. The steps 701–705 are repeated until the result of judgment at step 705 is that there is no unallowable unevenness. It is to be noted that, here, by using the ID number of an object the frequency of appearance of which is low in searching and extracting all the images having the object concerned by the image search section 82, reading them by the image reading section 83, and displaying them on the display section 87, selection of images for the album toward more averaged frequency of appearance can be made with ease and certainty.

On the other hand, as a result of the judgment at step 705, when the frequency of appearance is not unallowably uneven (N), the procedure goes to the next step 706 of image editing. At step 706, the image combining section 85 arranges the images selected for the album on the respective pages or combines them on a page as they are, after enlargement or reduction, after trimming, or the like. Further, if necessary, letters, a phrase, sentences, drawing, a character, or the like is combined thereto. Particularly in case of a group photograph, the names of the respective objects are combined to be in the image concerned or outside the image concerned. In this way, image data with regard to the whole pages of the album is prepared. Here, it is preferable that the display section 87 displays images on the respective pages such that the operator may confirm them.

Finally, at step 707, data including images of the whole pages of the album is outputted to the image output section 86. It is to be noted that the selected images for the album and images obtained by processing or combining may be prepared so as to be output separately from data such as a character or drawing.

In this way, the method of editing images for creating an album by the image editing apparatus 80 of FIG. 14 ends. Then, the image output section 86 outputs the printed images of the respective pages of the album, and all the pages are bound together into an album. The frequency of appearance of objects in the photographs in the album created in this way is averaged, and there is no unallowable unevenness.

The image editing apparatus for creating an album according to the present invention is basically structured as described in the above.

Next, an image editing apparatus for preparing an image order sheet for each object according to the present invention will be described.

An image editing apparatus 90 shown in FIG. 15 is an image editing apparatus for editing images in preparing the image order sheet for each object, and has an image memory 91, an image search section 92, an image reading section 93, an image processor 94, an image combining section 95, an image output section 96, and a display section 97.

It is to be noted that, since the image editing apparatus 90 is similar in structure to the image editing apparatus 80, detailed description of similar elements is omitted.

Here, the image memory 91 is similar in structure to the image memory 81.

Similarly to the image search section 82, the image search section 92 performs search in the image memory 91 using ID information of a particular object, and extracts hit images having the particular object. Here, the identification information of a group tour may be used to specify the group tour. Further, in case that a family or a group including the particular object join the group tour concerned, the ID information of the particular object may be partly in common to a part of the ID information of the rest of the family or group, and the search may be performed using the common portion. Alternatively, the search may be performed using plurality of ID information.

The image reading section 93 reads from the image memory 91 the image data of the images extracted by the image search section 92 and the photographing information (including the ID information) associated therewith.

The image processor 94 forms reduced images, for example, thumbnail images, of all the images having the object. It is to be noted that the image processor 94 may perform the above-described conventional image processing to improve the finishing of the reproduced images. Further, the image processor 94 may also serve as the controller (CPU) of the image editing apparatus 90.

The image combining section 95 edits and combines the reduced images such as the thumbnail images of the images having the particular object which is reduced by the image processor 94 for the purpose of preparing the order sheet for prints (images) of each object (hereinafter simply referred to as order sheet). Here, it is preferably that, as in an order sheet 110 for images of the respective objects shown in FIG. 17, letters such as the name 111 of the particular object "Ms. Hanako Fuji", the title 112 of the group tour "Order Sheet for Photographs in the Tour of . . . ", "Photograph Numbers" 114 "No. 3, No. 7, No. 26, No. 30, and No. 34" which are order numbers of the respective reduced images 113, and "Photograph Numbers/Number of Orders" in the order form 115 are combined with the edited thumbnail images. Of course, the mark or the name of a processing laboratory or a shop or drawing may also be combined therewith.

The image output section 96 outputs the order sheet having the reduced images (image data) with regard to the particular object which are edited and combined by the image combining section 95 as the order sheet 110 which is a hard-copy image.

The display section 97 is a monitor (display) for displaying the result of search by the image search section 92, a reproduced image of image data read by the image reading section 93 and its photographing information (such as its ID information), the reduced images such as the thumbnail images by the image processor 94, the order sheet combined by the image combining section 95, and the like.

Figure 17:
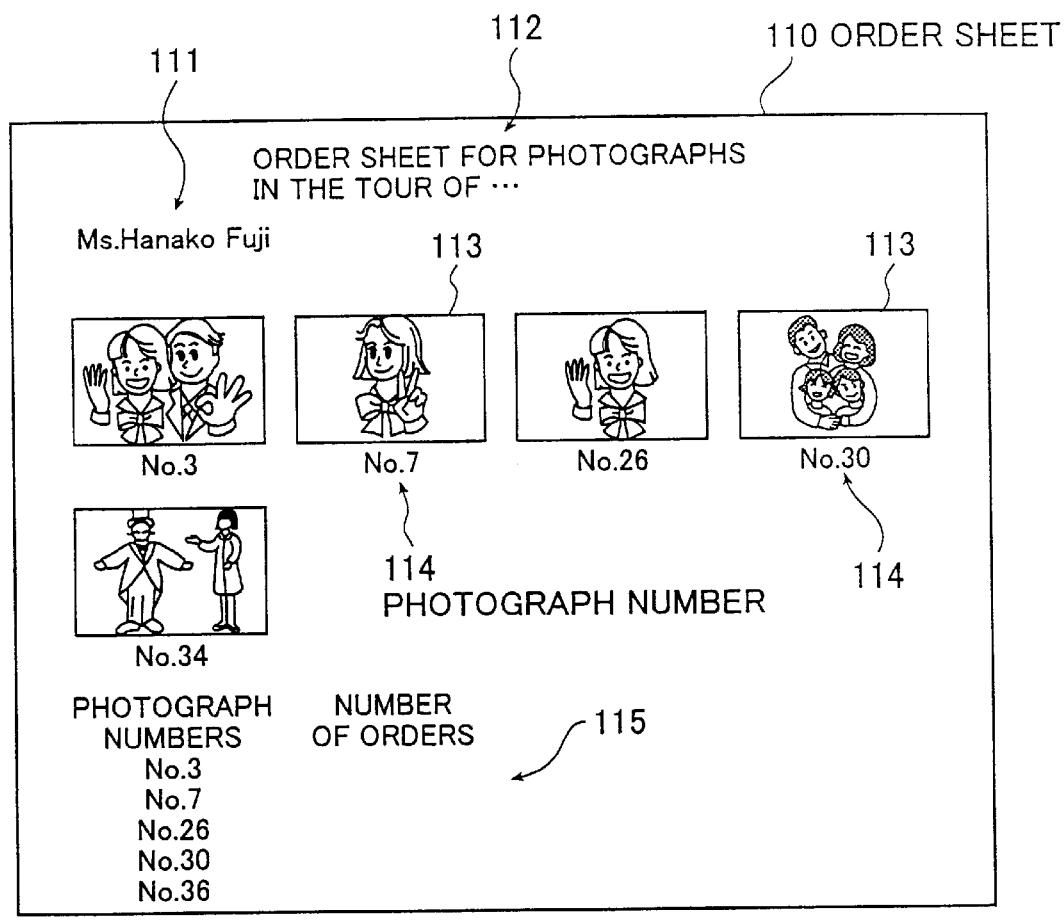
FIG. 17 is a schematic diagram of an embodiment of the image order sheet for each object according to the present invention.

As shown in FIG. 17, since only images having the particular object or person related to the particular object are selected to be in the order sheet 110 output from the image output section 96 of the image editing apparatus 90, what a person who wants to make an order has to do is only to confirm the numbers 114 of the photographs (the reduced images 113) the person needs and fill in the order form 115 with the numbers of orders. By using this order sheet 110, a person who wants to make an order need not trouble to look for photographs of someone among numerous photographs, and can order necessary photographs by necessary numbers quite easily. It is to be noted that an order may also be given by inputting numbers in the order form 115 of the order sheet 110 displayed on the display section 87.

It is to be noted that the image output section 96 is not limited to one which outputs the order sheet 110 as hardcopy images, and may deliver the data in the form of an image data recording medium with data of the order sheet 110 including the thumbnail images 113 recorded thereon or may deliver the data on a network via communication unit such as the Internet. By this, a person may display the order sheet 110 in the image data recording medium or the order sheet 110 delivered on the network on a monitor (display) of the person's personal computer, confirm the necessary photograph numbers 114 of the plurality of reduced images 113 on the displayed order sheet 110, input the necessary numbers in the order form 115, hand over the image data recording medium to a processing laboratory or a shop, or alternatively, sends back the order sheet 110 on the Internet or the like to give an order.

Such an ordering method on a network such as the Internet implements a method of ordering images with regard to the respective objects according to the present invention, and can save further trouble to give an order for printed photographs of images and can make the order easier.

The image photographing system, the image processing system, the image providing system connecting them, the photographing camera, the image editing apparatus, the image order sheet for each object, and the method of ordering images for each object according to the present invention are described in detail in the above with reference to the various embodiments. However, the present invention is not limited thereto and it is needless to say that various improvements and modifications may be made without departing from the spirit of the present invention.

For example, in the above image providing system, during a theme park or the like is enjoyed, when a photographing unit photographs a user, a reduced image of the photographed image is transmitted from the side of the photographing unit, the server, or the image system to a mobile telephone carried by the user. The user confirms the reduced image displayed on a display section of the mobile telephone. If the user needs the image, the user gives an order over the mobile telephone. The order may also be given otherwise. By this, the user can have printed images for which the user gave an order when the user leaves the theme park without spending much time waiting for the printing. It is to be noted that such utilization of a mobile telephone is also applicable to the ordering method using the image editing apparatus or using the Internet according to the present invention.

As described above in detail, according to the present invention, there can be obtained an advantage that the image photographing system, the image recording system and the image providing system composed of them connected to each other, which can effectively function even if many automatic photographing apparatuses are installed in a wide site such as a theme park, can be realized by the application of the transmitting and receiving function.

The present invention simplifies and ensures selection of photos to be performed when group albums of a single type are created from a multiplicity of group photos or orders are given for individual photos. Orders can be also given in an extremely simple manner.

What is claimed is:

1. An image photographing system comprising:
    a plurality of second communication devices for transmitting photographing information of objects to be photographed when at least said objects are photographed wherein at least one of said plurality of second communication devices is carried by said objects;
    a photographing device for photographing said objects;
    a first communication device operated in association with said photographing device for receiving said photographing information transmitted from said plurality of second communication devices; and
    a storing unit for storing said photographing information received from said plurality of second communication devices by said first communication device and image data of images of said objects photographed by said photographing device in which said photographing information and the image data of each of the images of said objects are related to each other.

2. The image photographing system according to claim 1, wherein:
    said first communication device is a transmitting/receiving unit for transmitting query information to said plurality of second communication devices simultaneously when, before or after said objects are photographed by said photographing device as well as for receiving said photographing information transmitted by said plurality of second communication devices; and
    at least one of said plurality of second communication devices is a transmitting/receiving unit for receiving said query information transmitted by said first communication device and for transmitting said photographing information in response to said query information.

3. The image photographing system according to claim 1, wherein:
    said first communication device is a receiving unit;
    at least one of said plurality of second communication devices is a transmitting unit; and
    said photographing device photographs said objects when said first communication device receives said photographing information transmitted from at least one of said plurality of second communication devices.

4. The image photographing system according to claim 1, wherein:
    at least one of said plurality of second communication devices is a transmitting unit for transmitting said photographing information at all times; and
    said first communication device is a receiving unit for receiving said photographing information transmitted by said plurality of second communication devices simultaneously when, before or after said objects are photographed by said photographing device.

5. The image photographing system according to claim 1, further comprising:
    an electromagnetic wave irradiation unit operated in association with said photographing device and for irradiating electromagnetic energy simultaneously when, before or after said objects are photographed by said photographing device,
    wherein at least one of said plurality of second communication devices is a transmitting unit which is started in response to said electromagnetic energy irradiated from said electromagnetic wave irradiation unit simultaneously when, before or after said objects are photographed by said photographing device and which transmits said photographing information; and
    said first communication device is a receiving unit for receiving said photographing information transmitted by said plurality of second communication devices.

6. The image photographing system according to claim 5, wherein said first communication device comprises said electromagnetic wave irradiation unit.

7. The image photographing system according to claim 1, wherein said photographing device, said first communication device and said storing unit are constructed integrally as a photographing camera.

8. The image photographing system according to claim 1, wherein, when said first communication device receives a plurality of said photographing information from said plurality of second communication devices, respectively, said storing unit stores image data of an image taken by said photographing device and said plurality of photographing information received from said plurality of second communication devices by relating them to each other.

9. The image photographing system according to claim 1, wherein said photographing information includes identification information for identifying said objects registered in each of said plurality of second communication devices.

10. An image photographing system according to claim 1, wherein said system comprises a plurality of first communication devices.

11. An image processing system comprising:
    an image search unit for searching image data of at least one image corresponding to at least one of photographing information from the photographic information and image data of images stored in a storing unit of an image photographing system by relating the image data and the photographing information, said image photographing system including:
  a second communication device for transmitting the photographing information of an object to be photographed when at least said object is photographed;
  a photographing device for photographing said object;
  a first communication device operated in association with said photographing device for receiving said photographing information transmitted from said second communication device; and
  said storing unit for storing said photographing information received from said second communication device by said first communication device and the image data of the images of said object photographed by said photographing device which are related to each other; and
  an image processing unit for processing the image data of said at least one image searched by said image search unit.

12. The image processing system according to claim 11, further comprising:
  a first reading unit for reading said photographing information recorded in said second communication device of said image photographing system,
  wherein said image search unit searches the image data of said at least one image corresponding to at least one of said photographing information read by said first reading unit from the image data of said images stored in said storing unit and said photographing information which are related to each other.

13. The image processing system according to claim 11, wherein at least one of said photographing information is identification information for identifying said object.

14. The image processing system according to claim 11, further comprising:
  an image display unit for displaying said at least one image searched by said image search unit;
  an image designation unit for designating a necessary image from said at least one image displayed on said image display unit; and
  an image output unit for outputting said designated image.

15. The image processing system according to claim 14 wherein, said image output unit is at least one of a print output unit for outputting said designated image as a photo print, a medium output unit for outputting an image data recording medium in which the image data of said designated image is recorded, and an image delivery unit for delivering the image data of said designated image through a communication unit.

16. An image providing system comprising:
  at least one image photographing system, each image photographing system including:
    a second communication device for transmitting photographing information of an object to be photographed when at least said object is photographed;
    a photographing device for photographing said object;
    a first communication device operated in association with said photographing device for receiving said photographing information transmitted from said second communication device; and
    a storing unit for storing said photographing information received from said second communication device by said first communication device and image data of images of said object photographed by said photographing device in which said photographing information and the image data of each of the images of said object are related to each other; and
  at least one image processing system, each image processing system including:
    an image search unit for searching image data of at least one image corresponding to at least one of photographing information from the photographic information and image data of images stored in said storing unit of said image photographing system by relating the image data and the photographing information; and
    an image processing unit for processing the image data of said at least one image searched by said image search unit;
  wherein at least one image photographing system and at least one image processing system are connected to each other.

17. A photographing camera comprising:
  a photographing device for photographing at least one object;
  a first communication device for receiving photographing information transmitted from a plurality of second communication devices carried by objects to be photographed, said photographing information including identification information for identifying said objects; and
  a storing unit for storing said photographing information of said objects received by said first communication device and the image data of the images of said objects photographed by said photographing device which are related to each other.

18. An image edit apparatus comprising:
  a storing unit for storing image data of images of a plurality of scenes photographed in relation to a plurality of objects and photographing information including identification information of said plurality of objects photographed in said respective images by relating said photographing information to the image data of said respective images;
  a reading unit for reading, from said storing unit, the image data of some images, which are selected from said images of said plurality of scenes in order to edit said some images as an album, and said photographing information stored in relation to the image data of said some images;
  a display unit for displaying reproduced images of said image data read by said reading unit; and
  a counting unit for counting, as to each of said plurality of objects photographed in said some selected images, photographing frequency of each object based on the identification information of each object read by said reading unit,
  wherein said photographing frequency of said each object counted by said counting unit is displayed on said display unit as to said plurality of objects.

19. The image edit apparatus according to claim 18, further comprising:
  an image search unit for searching the image data of said images stored in relation to said photographing information in said storing unit using the photographing information,
  wherein said image search unit searches the images in which said each object is photographed using the photographing information, which is displayed on said display unit, of said each object whose photographing frequency is out of a preset frequency range, and searched images are read by said reading unit and displayed on said display unit.

20. The image edit apparatus according to claim 18, further comprising:

an image combining unit for combining the image data of said some selected images so as to edit the same selected images as said album when said photographing frequency of said each object displayed on said display unit is within said preset frequency, wherein said some images, which are edited as said album based on said image data combined by said image combining unit, are displayed on said display unit.

21. The image edit apparatus according to claim 20, wherein said image combining unit combines information relating to the photographing information of said plurality of objects photographed in at least one image of said some images edited as said album as character data or line image data.

22. The image edit apparatus according to claim 20, further comprising:

an image output unit for outputting said some images combined as said image data by said image combining unit and edited as said album.

23. The image edit apparatus according to claim 18, wherein said storing unit is a storing unit for storing the images photographed by a photographing device in an image photographing system or a photographing camera, wherein said image photographing system comprises:

a second communication device for transmitting the photographing information of said each object to be photographed when at least said each object is photographed;

said photographing device for photographing said each object;

a first communication device operated in association with said photographing device for receiving said photographing information transmitted from said second communication device; and said storing unit for storing said photographing information received from said second communication device by said first communication device and the image data of the images of said each object photographed by said photographing device in which said photographing information and the image data of each of the images of said each object are related to each other, and wherein said photographing camera comprises:

said photographing device for photographing each object;

a first communication device for receiving the photographing information transmitted from each second communication device carried by said each object to be photographed, said photographing information including identification information for identifying said each object; and a storing unit for storing said photographing information of said each object received by said first communication device and the image data of the image of said each object photographed by said photographing device which are related to each other.

24. An image edit apparatus comprising:

a storing unit for storing image data of images of a plurality of scenes photographed in relation to a plurality of objects including a particular object and photographing information including identification information of said plurality of objects photographed in said respective images by relating said photographing information to the image data of said respective images;

an image search unit for searching and selecting a plurality of images relating to said particular object from said images of said plurality of scenes stored in said storing unit using said photographing information relating to said particular object;

a reading unit for reading the image data of said plurality of images searched and selected by said search unit;

an image processing unit for creating the image data of the respective reduced images of said plurality of images from the image data of said plurality of images read by said reading unit;

a combining unit for combining a name of said particular object, said respective reduced images of said plurality of images, order numbers of said respective images corresponding to said respective reduced images, and order number fields provided in correspondence to respective order numbers as an image order sheet for said particular object; and an image output unit for outputting said image order sheet for said particular object combined by said combination unit.

25. The image edit apparatus according to claim 24, further comprising:

a display unit for displaying at least one of a result of search carried out by said image search unit, said images or said photographing information read by said reading unit, said respective reduced images of said plurality of images created by said image processing unit, and said image order sheet for said particular object combined by said combining unit.

26. An image edit apparatus according to claim 24, wherein said storing unit is a storing unit for storing the images photographed by a photographing device in an image photographing system or a photographing camera, wherein said image photographing system comprises:

a second communication device for transmitting the photographing information of said each object to be photographed when at least said each object is photographed;

said photographing device for photographing said each object;

a first communication device operated in association with said photographing device for receiving said photographing information transmitted from said second communication device; and said storing unit for storing said photographing information received from said second communication device by said first communication device the image data of the images of said each object photographed by said photographing device in which said photographing information and the image data of each of the images of said each object are related to each other, and wherein said photographing camera comprises:

said photographing device for photographing each object;

a first communication device for receiving the photographing information transmitted from each second communication device carried by said each object to be photographed, said photographing information including identification information for identifying said each object; and a storing unit for storing said photographing information of said each object received by said first communication device and the image data of the image of said each object photographed by said photographing device which are related to each other.

27. The image edit apparatus according to claim 24, wherein said plurality of images relating to said particular object are images, in which said particular object is photographed, or images, in which at least one of a plurality of objects belonging to a particular group to which said particular object belongs, is photographed.

28. An image order sheet for each object comprising:
    a name of a particular object;
    reduced images of a plurality of images relating to said particular object selected from the images of a plurality of scenes photographed as to a plurality of objects including said particular object;
    order numbers of respective images corresponding to said reduced images of said plurality of images; and
    order number fields provided in correspondence to said respective order numbers.

29. A method of ordering at least one image for each object comprising the steps of:
    delivering, through a communication unit, an image order sheet for each object as data capable of being displayed on an image display unit, said order sheet including a name of a particular object, reduced images of a plurality of images relating to said particular object selected from images of a plurality of scenes photographed as to a plurality of objects including said particular object, order numbers of respective images corresponding to said reduced images of said plurality of images, and order number fields provided in correspondence to said respective order numbers;
    displaying said order sheet for each object on an image display unit carried by said particular object; and
    receiving number of orders for the respective images input to said order number field by said particular object.

30. An image photographing system comprising:
    second communication device for transmitting photographing information of an object to be photographed when at least said object is photographed wherein said second communication device is carried by said object;
    a photographing device for photographing said object;
    a first communication device operated in association with said photographing device for receiving said photographing information transmitted from said second communication device;
    a storing unit for storing said photographing information received from said second communication device by said first communication device and image data of images of said object photographed by said photographing device in which said photographing information and the image data of each of the images of said object are related to each other; and
    wherein said photographing device is located at a fixed location.

31. An image photographing system comprising:
    a second communication device for transmitting photographing information of an object to be photographed when at least said object is photographed wherein said second communication device is carried by said object;
    a photographing device for photographing said object;
    a first communication device operated in association with said photographing device for receiving said photographing information transmitted from said second communication device;
    a storing unit for storing said photographing information received from said second communication device by said first communication device and image data of images of said object photographed by said photographing device in which said photographing information and the image data of each of the images of said object are related to each other; and
    wherein said photographing device is self-activated.

32. An image photographing system comprising:
    a first communication device including a transmitting/receiving unit for transmitting query information to a plurality of second communication devices simultaneously when, before or after an object is photographed by a photographing device as well as for receiving photographing information transmitted by said plurality of second communication devices; and
    at least one of said plurality of second communication devices include a transmitting/receiving unit for receiving said query information transmitted by said first communication device and for transmitting said photographing information in response to said query information wherein at least one of said plurality of second communication devices is carried by said object.

33. An image photographing system comprising:
    a first communication device including a transmitting/receiving unit for transmitting query information to a plurality of second communication devices simultaneously when, before or after an object is photographed by a photographing device as well as for receiving photographing information transmitted by said plurality of second communication devices; and
    at least one of said plurality of second communication devices include a transmitting/receiving unit for receiving said query information transmitted by said first communication device and for transmitting said photographing information in response to said query information.

34. A method of ordering at least one image for each object comprising the steps of:
    delivering, through a communication unit, an image order sheet for each object as data capable of being displayed on an image display unit, said order sheet including a name of a particular object, reduced images of a plurality of images relating to said particular object selected from images of a plurality of scenes photographed as to a plurality of objects including said particular object, order numbers of respective images corresponding to said reduced images of said plurality of images, and order number fields provided in correspondence to said respective order numbers.

* * * * *